(12) United States Patent
Matsumoto

(10) Patent No.: US 8,705,327 B2
(45) Date of Patent: Apr. 22, 2014

(54) HEAD FOR THERMAL ASSISTED MAGNETIC RECORDING DEVICE, AND THERMAL ASSISTED MAGNETIC RECORDING DEVICE

(75) Inventor: Takuya Matsumoto, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 107 days.

(21) Appl. No.: 12/984,635

(22) Filed: Jan. 5, 2011

(65) Prior Publication Data

US 2011/0170381 A1    Jul. 14, 2011

(30) Foreign Application Priority Data

Jan. 14, 2010   (JP) ................................ 2010-006205

(51) Int. Cl.
*G11B 7/085*   (2006.01)
(52) U.S. Cl.
USPC ...................................... 369/30.03
(58) Field of Classification Search
None
See application file for complete search history.

(56) References Cited

U.S. PATENT DOCUMENTS

| | | | |
|---|---|---|---|
| 6,768,556 B1 | 7/2004 | Matsumoto et al. | |
| 7,898,759 B2 * | 3/2011 | Matsumoto et al. | ............. 360/59 |
| 2003/0066944 A1 | 4/2003 | Matsumoto et al. | |
| 2004/0085862 A1 | 5/2004 | Matsumoto et al. | |
| 2005/0254355 A1 * | 11/2005 | Rettner et al. | ............. 369/13.24 |
| 2007/0139818 A1 | 6/2007 | Shimazawa et al. | |
| 2007/0177302 A1 | 8/2007 | Shimazawa et al. | |
| 2008/0080039 A1 * | 4/2008 | Hongo et al. | ................... 359/237 |
| 2008/0191122 A1 * | 8/2008 | Hongo et al. | ............. 250/201.5 |
| 2009/0285524 A1 * | 11/2009 | Ishii et al. | ....................... 385/14 |
| 2009/0290454 A1 * | 11/2009 | Fontana et al. | ............. 369/13.13 |
| 2010/0103553 A1 | 4/2010 | Shimazawa et al. | |
| 2010/0165822 A1 * | 7/2010 | Balamane et al. | ....... 369/112.27 |
| 2011/0096435 A1 * | 4/2011 | Sasaki et al. | ............. 360/114.01 |
| 2011/0096639 A1 * | 4/2011 | Matsumoto | ................ 369/13.33 |
| 2011/0116349 A1 * | 5/2011 | Komura et al. | ............. 369/13.33 |
| 2011/0157738 A1 * | 6/2011 | Shimazawa et al. | ............. 360/59 |
| 2011/0164479 A1 * | 7/2011 | Komura et al. | ............. 369/13.33 |
| 2012/0082016 A1 * | 4/2012 | Komura et al. | ............. 369/13.33 |
| 2012/0139566 A1 * | 6/2012 | Shimazawa et al. | ..... 324/750.01 |

FOREIGN PATENT DOCUMENTS

| | | |
|---|---|---|
| JP | 2001-255254 | 9/2001 |
| JP | 2003-114184 | 4/2003 |
| JP | 2004-151046 | 5/2004 |
| JP | 2005-4901 | 1/2005 |
| JP | 2007-164935 | 6/2007 |
| JP | 2007-207349 | 8/2007 |
| JP | 2010-108584 | 5/2010 |

OTHER PUBLICATIONS

Hideki Saga et al., New Recording Method Combining Thermo-Magnetic Writing and Flux Detection, Japanese Journal of Applied Physics, Mar. 1999, pp. 1839-1840, vol. 38, Part 1, No. 3B.
Office Action issued in Japanese Patent Application No. 2010-006205 on Mar. 13, 2012.

* cited by examiner

*Primary Examiner* — Adam R Giesy
*Assistant Examiner* — Henok Heyi
(74) *Attorney, Agent, or Firm* — Antonelli, Terry, Stout & Kraus, LLP.

(57) ABSTRACT

An optical near-field generating efficiency of an optical near-field generating element is improved and a temperature rise of the element is suppressed. An optical near-field is generated using a conductive structure having a cross-sectional shape whose width in a direction perpendicular to a polarization direction of incident light transmitted through a waveguide gradually becomes shorter toward a vertex where an optical near-field is generated and having a shape whose width gradually, or in stages, becomes smaller in a traveling direction of the incident light toward the vertex where an optical near-field is generated. The waveguide is arranged beside the conductive structure and an optical near-field is generated via a surface plasmon generated on a lateral face of the conductive structure.

19 Claims, 34 Drawing Sheets

HEAD FOR THERMAL ASSISTED MAGNETIC RECORDING DEVICE, AND THERMAL ASSISTED MAGNETIC RECORDING DEVICE

CLAIM OF PRIORITY

The present application claims priority from Japanese patent application JP 2010-006205 filed on Jan. 14, 2010, the content of which is hereby incorporated by reference into this application.

CROSS-REFERENCE TO RELATED APPLICATION

This application is related to U.S. application Ser. No. 12/903,276 filed on Oct. 13, 2010, the disclosure of which is hereby incorporated by reference into this application.

BACKGROUND OF THE INVENTION

1. Field of the Invention

The present invention relates to a thermally assisted magnetic recording head including an optical near-field generator and a magnetic recording device using the thermally assisted magnetic recording head.

2. Background Art

A thermally assisted magnetic recording system has been recently proposed as a recording system that realizes a recording density of 1 Tb/in$^2$ or higher (H. Saga, H. Nemoto, H. Sukeda, and M. Takahashi, Jpn. J. Appl. Phys. 38, Part 1, 1839 (1999)). With a conventional magnetic recording device, loss of recorded information due to thermal fluctuation problematically occurs at a recording density of 1 Tb/in$^2$ or greater. While a coercive force of the magnetic recording device must be increased in order to prevent such information loss, since there is a limit to the magnitude of a magnetic field that can be generated from a recording head, excessively increasing the coercive force makes it impossible to form recorded bits on a medium. In order to solve this problem, the thermally assisted magnetic recording system heats a medium at the instant of recording to reduce coercive force. Consequently, recording can be performed on a high-coercive force medium and a recording density of 1 Tb/in$^2$ or greater can be realized.

In the thermally assisted magnetic recording device, a spot diameter of irradiated light must approximately match the size of a recorded bit (several 10 nm). This is because information on an adjacent track ends up being erased if a light spot diameter is greater than the size of a recorded bit. An optical near-field is used to heat such a minute area. An optical near-field is a localized electromagnetic field (a light whose wave number has an imaginary component) existing in the vicinity of a minute object that is equal to or smaller than light wavelength and is generated using a minute opening or a metallic scatterer whose diameter is equal to or smaller than light wavelength. For example, Japanese Patent Publication (Kokai) No. 2001-255254A proposes an optical near-field generating element using a triangular metallic scatterer as a high-efficiency optical near-field generating element. When light is incident to the metallic scatterer, a plasmon resonance is excited within the metallic scatterer and an intense optical near-field is generated at a vertex of the triangle. The use of the optical near-field generating element enables light to be collected in a highly efficient manner at an area of several 10 nm or smaller. In addition, Japanese Patent Publication (Kokai) No. 2004-151046A proposes a structure in which, on a surface of the metallic scatterer on a side of a slider air-bearing surface, a depression is carved on the surface in a part other than a vertex where an optical near-field is generated. The structure enables reduction of a width of an intensity distribution of the optical near-field generated at the vertex and, at the same time, enables suppression of the generation of a weak optical near-field (background light) generated on a side opposite to the vertex.

SUMMARY OF THE INVENTION

With thermally assisted magnetic recording, since a semiconductor laser must be driven in addition to a magnetic head, power consumption inadvertently increases by just that much. Lowering power consumption requires an optical near-field generating efficiency of the optical near-field generating element to be increased as much as possible. In addition, light irradiated on the optical near-field generating element is absorbed by the optical near-field generating element and causes a rise in the temperature of the element. Therefore, continuously irradiating light over a prolonged period of time causes deterioration of the optical near-field generating element due to changes in the shape of the optical near-field generating element, generation of an internal crack, and the like attributable to a rise in temperature, resulting in a decrease in optical near-field generating efficiency.

It is an object of the present invention to improve the optical near-field generating efficiency of an optical near-field generating element and to reduce a rise in temperature of the element.

In order to achieve the object described above, the present invention uses, as means for generating an optical near-field, a structure that is conductive and has a shape which, when seen from a side of a air-bearing surface, a width thereof becomes gradually smaller toward a vertex where an optical near-field is generated such as an triangle, and when seen from a lateral face of a slider, the width thereof is wider on an upper part (a side opposite to the slider air-bearing surface). The upper part of the structure is adapted to become wider in a direction perpendicular to a polarization direction. While any material may be used for the structure as long as such material is conductive, metal is preferable.

An optical waveguide is arranged beside the structure in order to guide light to the structure. When an evanescent light generated at an interface of a core and a clad of the optical waveguide strikes a lateral face of the upper part of the structure, if the polarization direction of light transmitted through the waveguide is perpendicular to an interface of the conductive structure and the clad, a surface plasmon that is a compression wave of electrical charges is generated on the interface of the conductive structure and the clad. By arranging the width of the upper part of the conductive structure as seen from the lateral face of the slider to gradually become smaller toward a lower part, surface plasmon generated on the upper part of the conductive structure collects at a narrowed portion of the lower part of the conductive structure. When a surface plasmon reaches the lower part of the conductive structure, a localized plasmon is generated at the lower part. At this point, charges oscillating the inside of the conductive structure gather at a sharp-pointed tip and a localized electromagnetic field or, in other words, an optical near-field is generated in a vicinity of the tip. In particular, when a recording medium exists in a vicinity of an optical near-field generating element, interaction occurs with image charges in the medium. Therefore, charges in the conductive structure are further attracted toward the side of the medium and an intense optical near-field is generated at the sharp-pointed tip.

Materials constituting the conductive structure may be adapted to partially differ from each other. For example, the material of the tip or the side of the waveguide may differ from the material of other parts.

A taper angle of the widened portion of the upper part of the conductive structure favorably ranges from 15 degrees to 60 degrees, inclusive. Such an arrangement enables a light use efficiency of 5% that is necessary to achieve a recording density of 2.5 Tb/in² or greater to be achieved. In order to achieve a light use efficiency of 5%, a distance between the waveguide and the conductive structure is favorably set to 100 nm or less.

Light use efficiency is dependent on a height of the conductive structure. When the optical waveguide and the conductive structure are in contact with each other, while the energy of light in the waveguide is converted to energy of the surface plasmon, conversely, the energy of the surface plasmon may also be converted into energy of light in the waveguide. While an appropriate length of an overlapping portion of the waveguide core and the conductive structure enables light energy to be efficiently converted into surface plasmon energy, an inappropriate length of the overlapping portion results in light once coupled to the surface plasmon returning to the waveguide. In such a state, a proportion of light in the waveguide that is coupled to a surface plasmon periodically varies with respect to length. In other words, if Lc denotes a minimum value of an optimal length that enables efficient coupling of light in the waveguide to a surface plasmon (Coupling length), light in the waveguide efficiently couples to a surface plasmon when the length is mLc (where m is an integer equal to or greater than 1). A preferable height of the conductive structure is dependent on a wavelength λ and a refractive index n of a dielectric body in contact with a lateral face of the structure, and is favorably set to $$\left(\frac{\lambda}{2}+10\right)\times(-0.778n+2.268) \text{ to} \quad (1)$$
$$(\lambda+720)\times(-0.778n+2.268), \text{ inclusive,}$$

in order to achieve a light use efficiency of 5% or greater (unit: nm).

The taper angle of the tapered part at the upper part of the conductive structure may be varied in multiple stages. The upper part of the conductive structure may be shaped as a rectangle. In this case, the width of the upper part of the conductive structure in a direction perpendicular to the polarization direction is favorably set greater than the width of the waveguide. In other words, a maximum width in a track width direction of the conductive structure is desirably greater than the width of the waveguide.

In order to achieve a light use efficiency of 5% or greater, a distance from the slider air-bearing surface (a surface having a point where an optical near-field is generated) to the widened portion of the conductive structure is favorably set to $$\left(\frac{\lambda}{10}+102\right)\times(-0.778n+2.268) \text{ to} \quad (2)$$
$$\left(\frac{\lambda}{2}-40\right)\times(-0.778n+2.268), \text{ inclusive}$$

(unit: nm).

A width in a vertical direction of the conductive structure may be expanded at both ends of the conductive structure. Accordingly, heat radiating performance can be improved and a temperature rise of the element can be reduced.

At the upper part of the conductive structure, the conductive structure and a main pole for applying a magnetic field may be brought into contact with each other. Accordingly, heat generated in the conductive structure becomes more easily guided to the side of the main pole and a temperature rise of the element can be reduced.

A width in a direction parallel to the polarization direction of incident light of the upper part of the conductive structure may be varied so that the upper part of the conductive structure protrudes to the side of the main pole or to the side of the waveguide.

A layer constituted by a conductive material may be formed beside the main pole. Accordingly, heat radiating performance can be improved and a temperature rise of the element can be suppressed. In addition, the layer constituted by a conductive material formed beside the main pole may be brought into contact with the conductive structure that generates an optical near-field. Accordingly, since heat generated at the optical near-field generating element is directly transferred to the layer constituted by a conductive material formed beside the main pole, a temperature rise of the optical near-field generating element can be further reduced.

An end of the core may be inclined at a termination of the waveguide. If not inclined, light is reflected at a boundary between the core and air on the slider air-bearing surface and light ends up returning in a direction of an entrance to the waveguide. A part of the returned light is further reflected at the entrance of the waveguide and advances toward an exit of the waveguide. The returned lights interfere with each other inside the waveguide and cause a fluctuation of optical power inside the waveguide. In addition, a part of the light reflected at a boundary between the core and air returns to the semiconductor laser. An output intensity of the semiconductor laser fluctuates due to the returned light. By inclining the termination of the waveguide, the reflected light at the termination no longer returns to the entrance-side of the waveguide and fluctuation of optical power is reduced. Furthermore, by setting an angle of the core termination to within an appropriate range, generated optical near-field intensity can be reinforced. To this end, the angle of the core termination is favorably set to 60 degrees or less if the core termination not inclined is assumed to have an angle of 0 degrees.

A light blocking film may be formed at the termination of the waveguide in order to prevent light outputted from the termination of the waveguide from irradiating a medium as background light.

The width of the waveguide may be set to a width that enables the waveguide to become a multi-mode waveguide. Accordingly, a coupling efficiency when introducing laser light into the waveguide can be increased.

While a tip of the main pole favorably has a trapezoidal or rectangular cross-sectional shape, in this case, a depression may be formed in the vicinity of a point where an optical near-field is generated. Magnetic field intensity becomes greater the closer to an edge of the main pole. By depressing a part of the main pole, a position heated by light can brought closer to the center of the main pole and, consequently, the magnetic field intensity at the heated position can be increased. As a result, recording can now be performed on media with greater coercive force (or anisotropy field) and recording density can be improved. In addition, in thermally assisted magnetic recording, a boundary (recording point) of a recorded bit is determined by a position where a temperature gradient dT/dx is minimum, where T denotes temperature. In this case, at the recording point, the smaller a gradient $dH_{eff}/$ dx of an effective magnetic field intensity $H_{eff}$, the clearer the boundary of recorded bits, thereby enabling a high recording density to be realized. The effective magnetic field intensity $H_{eff}$ becomes stronger at an edge part of the main pole. When the heated position is on the outside of the main pole, the magnetic field gradient at the recording point takes a positive value. However, when the heated position approaches the center of the main pole, the magnetic field gradient at the recording point takes a negative value and a position where $dT/dx$ is minimum and a position where $dH_{eff}/dx$ is minimum can be superimposed. Therefore, the boundary between recorded bits becomes clearer and a high recording density can be achieved.

According to the present invention, since a waveguide is arranged beside a conductive structure and an optical near-field is generated via a surface plasmon generated at an interface of the conductive structure and the waveguide, optical near-field generating efficiency can be improved. In addition, since a cubic volume of an element can be increased, heat radiating performance can be improved and a temperature rise of a optical near-field generating element can be suppressed.

Figure 1:
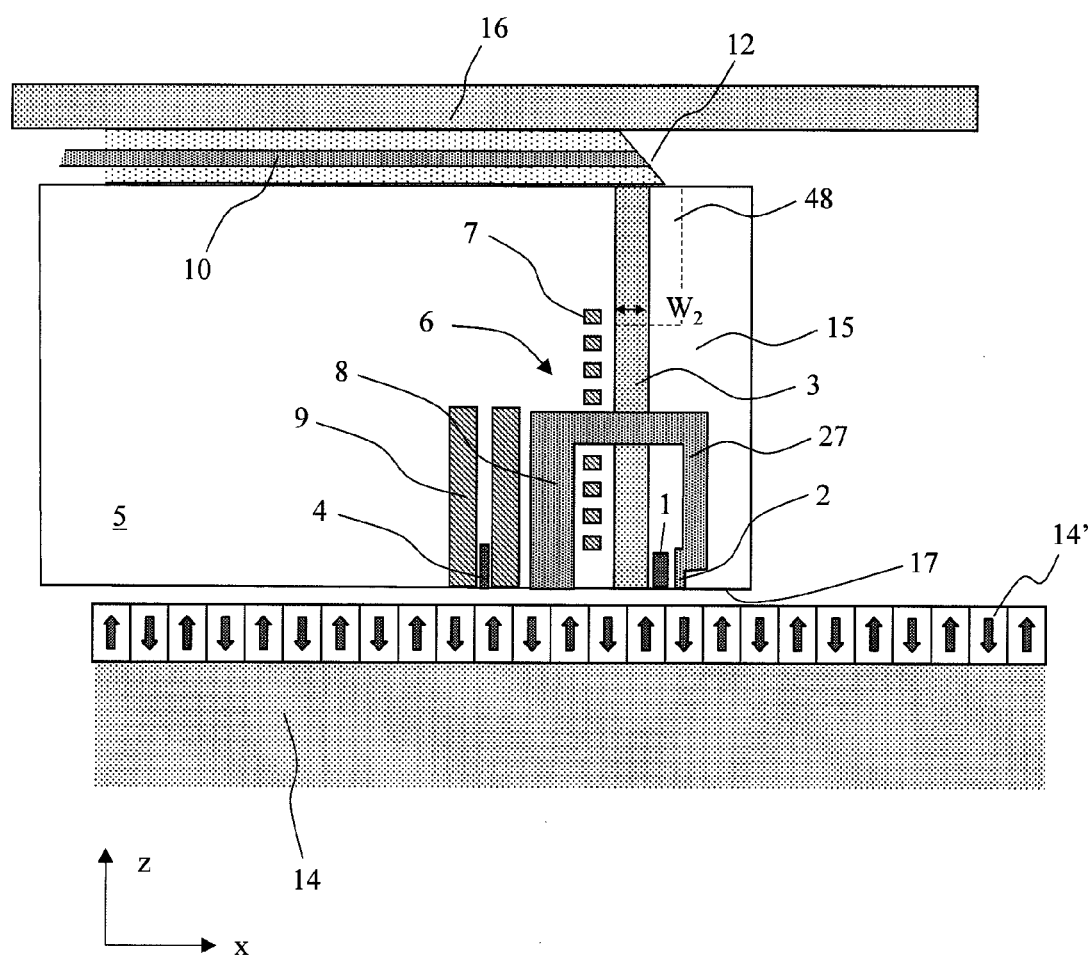
FIG. 1 is a schematic cross-sectional view illustrating a configuration of a magnetic head according to the present invention.

DESCRIPTION OF SYMBOLS 1 optical near-field generating element (metallic structure)
2 main pole
3 waveguide core
4 reproducing element
5 slider
6 magnetic head
7 coil
8 return pole
9 shield
10 polymer waveguide
12 mirror
13 suspension
14 recording medium
14' recording layer
15 waveguide clad
16 flexure part of suspension
17 slider air-bearing surface
20 vertex
21 metallic structure upper part
22 metallic structure lower part
23 polarization direction of incident light
24 incident direction of incident light
25 recessed part of scatterer surface
26 optical near-field
27 magnetic pole transmitting flux
28 main pole upper part
29 waveguide-side lateral face of metallic structure
30 dielectric layer on lateral face of waveguide
31 edge of magnetic pole tip
32 tapered part of metallic structure
33 widened portion of metallic structure upper part
34 vertically widened portion
35 magnetic pole-side lateral face of metallic structure
36 portion in contact with dielectric body
37 lower part of widened portion of metallic structure
38 waveguide core termination
39 light blocking film
40 edge of light blocking film
41 conductive layer beside main pole
42 layer whose material differs from other parts
43 width varying portion
48 spot size converter
49 voice coil motor
50 FPC
51 wiring terminal
52 driver circuit board
53 spindle motor
54 signal-processing LSI
55 semiconductor laser
56 tail part of suspension
60 surface-emitting laser
61 submount
70 resist pattern
71 layer of magnetic pole material
72 dielectric layer
73 metallic layer
74 metallic layer
75 first dielectric layer
76 second dielectric layer
77 dielectric or nonmagnetic metallic layer
78 bulge of upper part of main pole
79 depression formed on main pole
101 surface plasmon
102 metallic scatterer

DETAILED DESCRIPTION OF THE PREFERRED EMBODIMENT

Hereinafter, an embodiment of the present invention will be described with reference to the drawings. In the following drawings, an x direction denotes a track direction, a y direction denotes a track width direction, and a z direction denotes a direction perpendicular to a air-bearing surface. In addition, an example in which a conductive structure is made of metal will be used in the following description.

FIG. 1 is a schematic cross-sectional view illustrating a configuration example of a magnetic head according to the present invention. The magnetic head according to the present invention includes a thermally assisted magnetic recording head and a reproducing head. The thermally assisted magnetic recording head includes a recording magnetic field generating unit and an optical near-field generating unit. A recording magnetic field is generated by a magnetic head unit 6 made up of a coil 7, a fat magnetic pole 27 for transmitting flux generated at the coil, a main pole 2, and a return pole 8.

A magnetic field generated by the coil 7 is transmitted through the fat magnetic pole 27 to the main pole 2 arranged in a vicinity of an optical near-field generating element 1. At the moment of recording, a medium is heated by an optical near-field generated by the optical near-field generating element 1 and, at the same time, a recording mark is written onto a recording layer 14' by applying a recording magnetic field generated by the main pole 2 to a recording medium 14.

Figure 2:
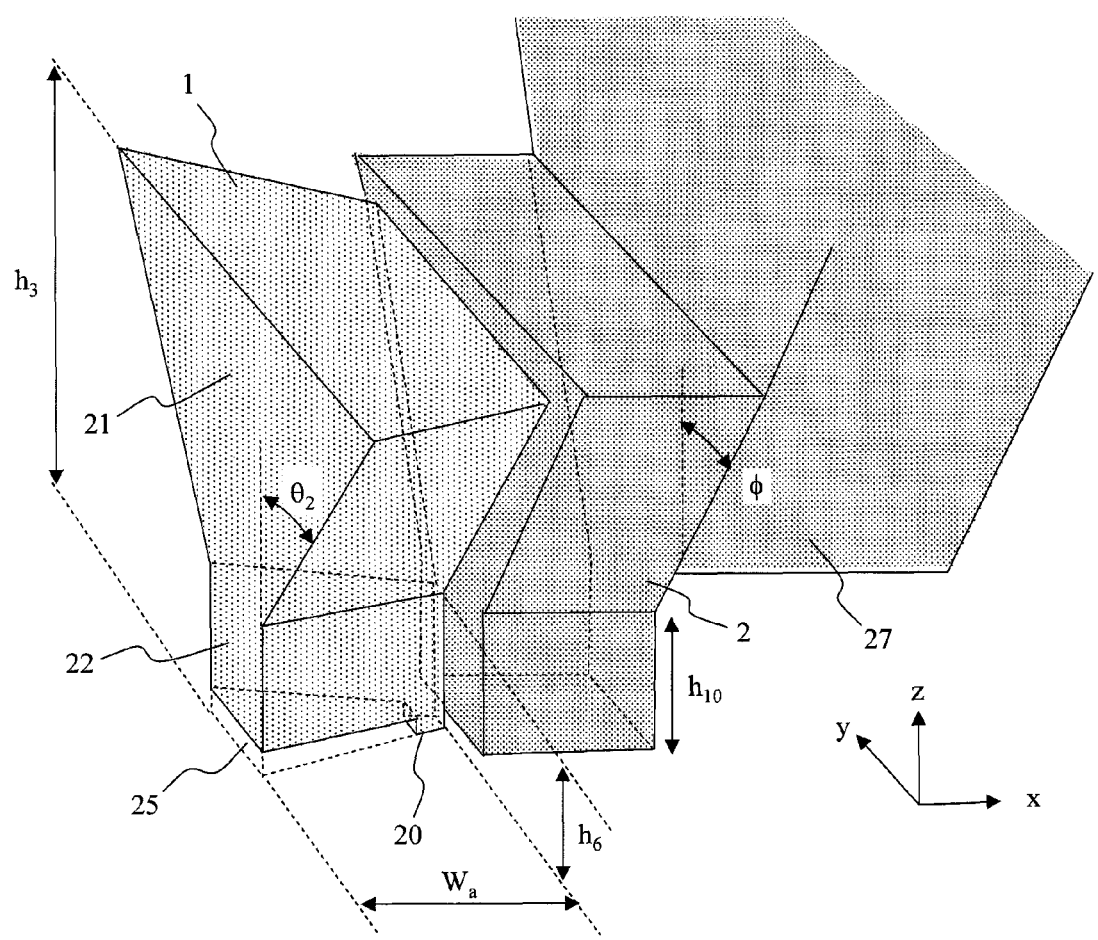
FIG. 2 is an enlarged schematic view of a main pole tip and an optical near-field generating element.
Figure 3:
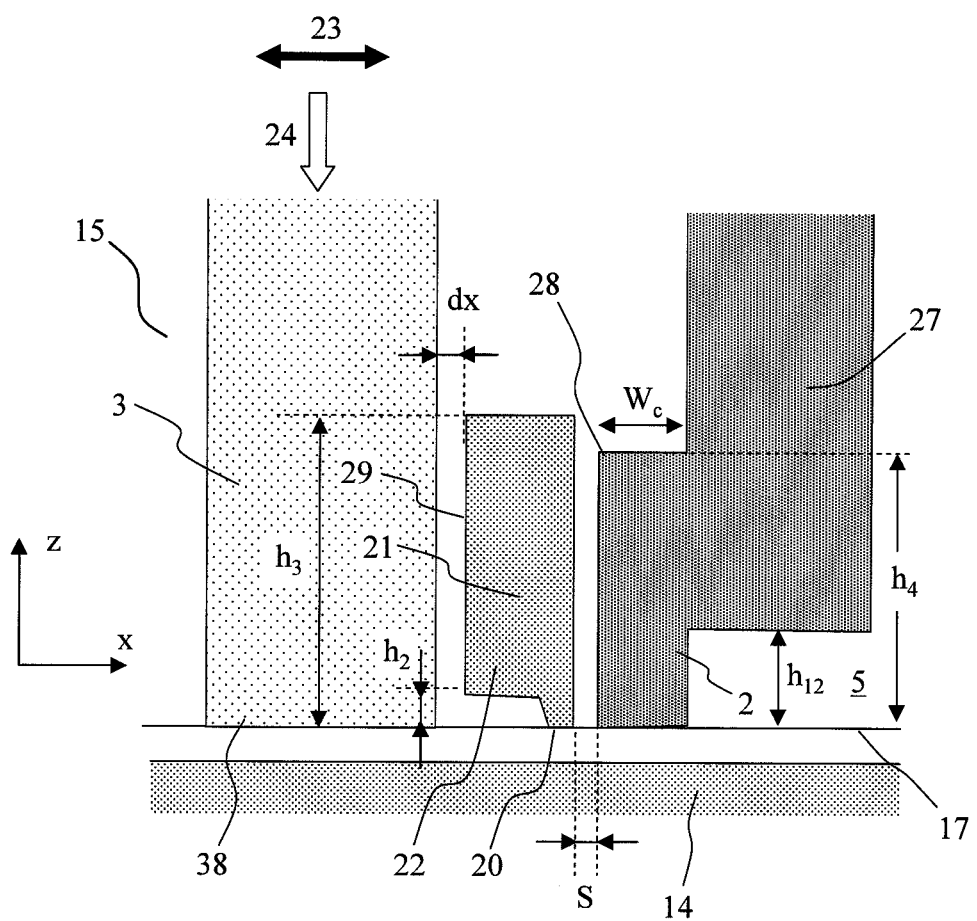
FIG. 3 is a schematic lateral cross-sectional view of the main pole tip and the optical near-field generating element.
Figure 4:
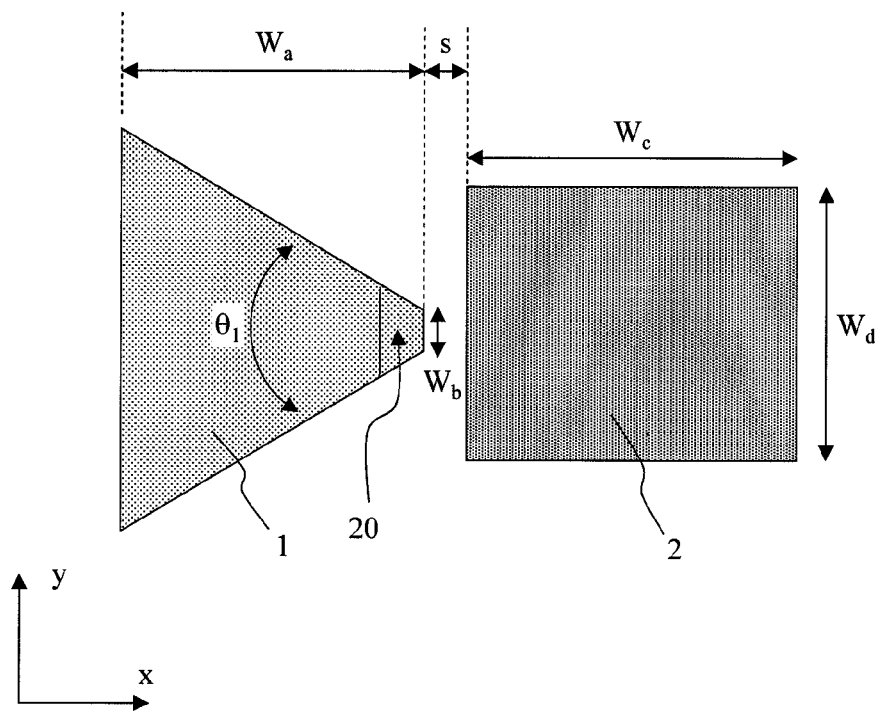
FIG. 4 is a schematic view of the main pole tip and the optical near-field generating element as seen from a side of a air-bearing surface.

FIG. 2 illustrates an enlarged schematic view of the main pole 2 and the optical near-field generating element 1. In addition, FIG. 3 is a schematic view of cross sections of the main pole 2 and the optical near-field generating element 1 parallel to an xz plane, and FIG. 4 is a diagram illustrating the main pole 2 and the optical near-field generating element 1 as seen from a side of the air-bearing surface.

As for the magnetic poles, the main pole 2 is formed beyond the fat magnetic pole 27 for transmitting a flux generated at the coil. A tip of the main pole 2 is given a narrow width, wherein widths ($W_c$, $W_d$) in the x direction and the y direction of the tip of the main pole are set so that $W_c$=150 nm, $W_d$=100 nm, and a height of the narrowed portion (throat height) $h_{10}$ is set to 50 nm. An upper portion of the narrowed part is adapted to become gradually wider and an angle $\phi$ of a tapered part thereof is set to 45 degrees. A height $h_4$ of the main pole is set to 500 nm. A distance $h_{12}$ between the fat magnetic pole 27 and a slider air-bearing surface 17 is set to 100 nm. NiFe or CoFe alloy is used as a material of the magnetic poles. The use of such a structure enables a magnetic field generated by the coil to be concentrated in a narrow area and an intense magnetic field of 10 kOe or greater to be generated at an optically-heated position.

As illustrated in FIG. 1, a reproducing head including a magnetic reproducing element 4 is formed beside the writing head. In the present example, a GMR (Giant Magneto Resistive) element or a TMR (Tunneling Magneto Resistive) element is used as the magnetic reproducing element 4. A magnetic shield 9 for preventing leakage of the magnetic field is formed around the magnetic reproducing element 4.

Figure 40A:
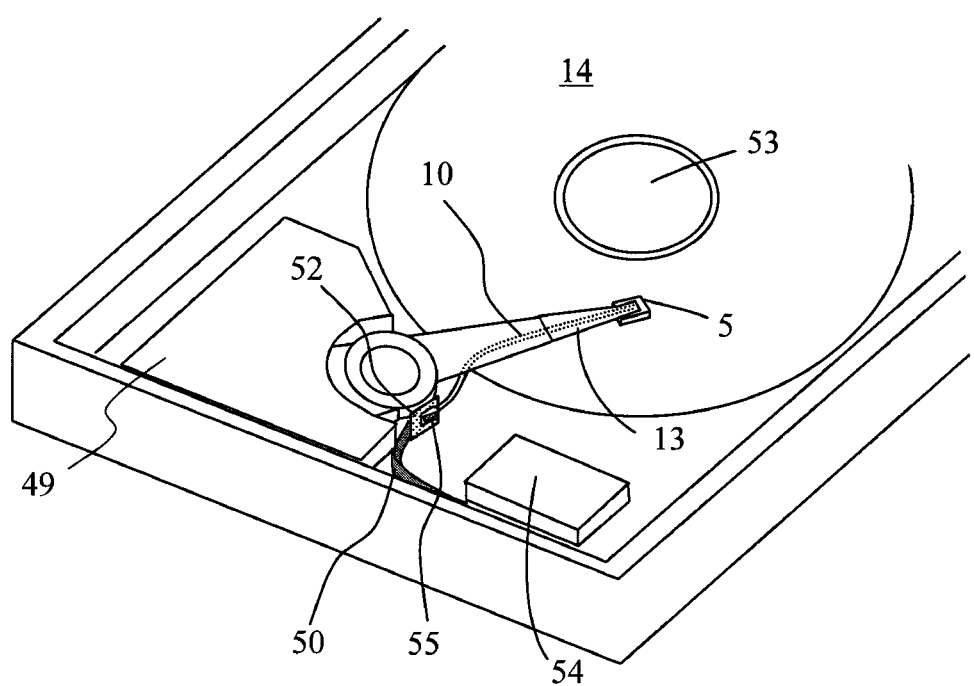
FIG. 40A is a diagram illustrating a configuration example of a recording/reproducing device.
Figure 40B:
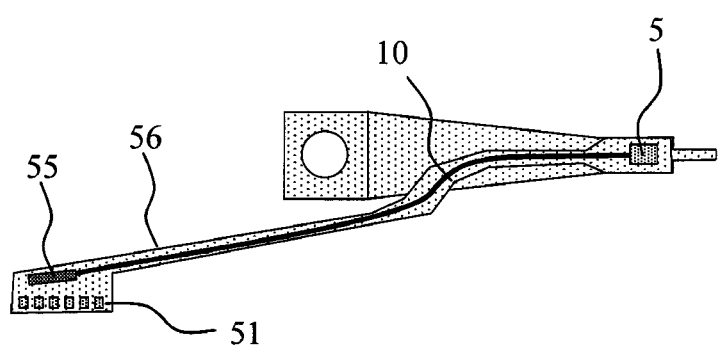
FIG. 40B is a diagram illustrating a suspension part.

A semiconductor laser with a wavelength of 780 to 980 nm is used as a light source for optical heating and is installed in a vicinity of a base of a suspension (refer to reference numeral 55 in FIGS. 40A and 40B). A polymer waveguide 10 is used to transmit light from the light source to a slider 5. The polymer waveguide 10 is arranged on a flexure part 16 of the suspension. A 45-degree mirror 12 is formed on an end face of the polymer waveguide 10 to have light outputted from the polymer waveguide 10 enter an upper face of the slider 5 perpendicularly. While the polymer waveguide 10 is used in the present example as a waveguide for transmitting light from the light source to the slider 5, other waveguides made of quartz fiber, plastic fiber, or the like may be used instead.

A recording waveguide 3 (whose core part is illustrated in FIG. 3) for guiding light from a side opposite to the slider air-bearing surface (medium-opposing surface) 17 to the slider air-bearing surface 17 is formed inside the floating slider 5. $Ta_2O_5$ is used as a material of the core and $Al_2O_3$ is used as a material of a clad part 15 of the recording waveguide 3 in the slider. As for core widths, when the wavelength is 780 nm, a core width $W_1$ in a direction perpendicular to the direction of the recording track is set to 500 nm and a core width $W_2$ in a direction parallel to the direction of the recording track is set to 300 nm, and when the wavelength is 980 nm, the core width $W_1$ in the direction perpendicular to the direction of the recording track is set to 650 nm and the core width $W_2$ in the direction parallel to the direction of the recording track is set to 350 nm. The core widths may be set to other values and, for example, may be set such that $W_1$=600 nm and $W_2$=150 nm when wavelength is 780 nm. Materials that ensure a refractive index of the core to be greater than a refractive index of the clad are to suffice for the waveguide 3. For example, $Al_2O_3$ may be used as the clad material and $TiO_2$ as the core material. Alternatively, $SiO_2$ may be used as the clad material and $Ta_2O_5$, $TiO_2$, $SiO_xN_y$, or Ge-doped $SiO_2$ as the core material.

Figure 5:
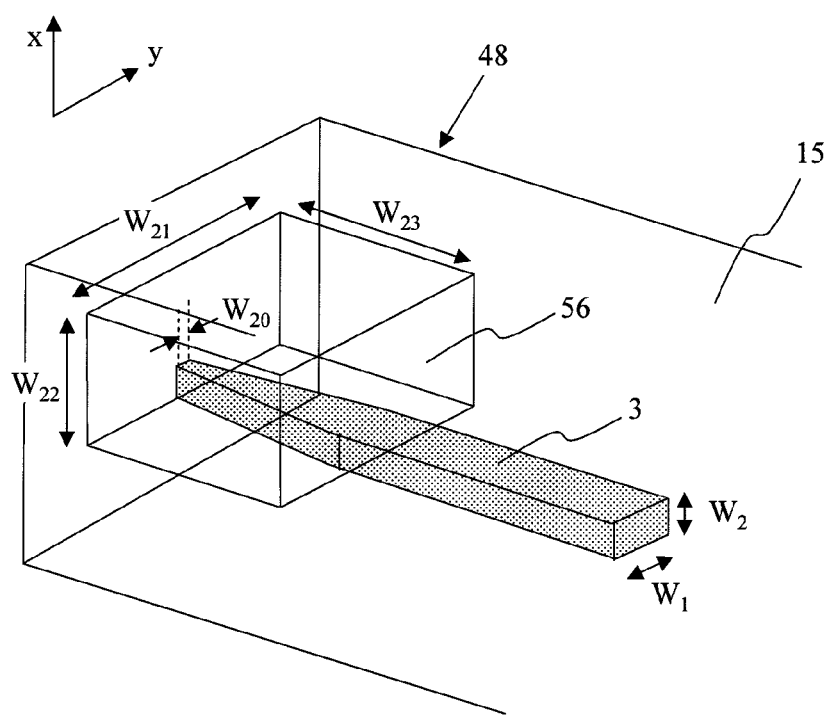
FIG. 5 is a schematic view illustrating a waveguide mode field diameter converter.

In order to ensure that outgoing light from the semiconductor laser couples efficiently to the waveguide 3, a spot size converter 48 such as that illustrated in FIG. 5 is formed at an entrance of the waveguide 3. A width $W_{20}$ on an entrance-side of the waveguide 3 is set smaller than $W_1$, and a layer 56 made of a material with a refractive index intermediate between the refractive index of the core and the refractive index of the clad 15 of the waveguide 3 is formed at a periphery of the $Ta_2O_5$ core. The use of such a structure enables a mode field diameter at an incident part of the waveguide to be expanded. As a result, a coupling efficiency of outgoing light from the semiconductor laser to the waveguide can be increased. In the present example, $SiO_xN_y$ is used as a material of the layer 56, and a ratio of O to N in $SiO_xN_y$ is adjusted such that a refractive index of $SiO_xN_y$ is greater than a refractive index of $Al_2O_3$ by 0.05. The incidence-side width $W_{20}$ of the waveguide core is set to 80 nm. For the layer 56, a width $W_{21}$ is set to 10 μm, a width $W_{22}$ to 5 μm, and a length $W_{23}$ to 150 μm.

For the optical near-field generating element, as illustrated in FIGS. 2 and 4, a metallic structure 1 is used having a shape (in the present example, a triangle) as seen from the slider air-bearing surface whose width gradually decreases toward a vertex 20 where an optical near-field is generated and, as illustrated in FIG. 2, a shape as seen from a lateral face of the slider whose width gradually decreases toward a bottom face of the slider (a face of the slider on a side of the air-bearing surface). A distance s between the vertex 20 where an optical near-field is generated and the main pole is set to 20 nm.

Figure 6A:
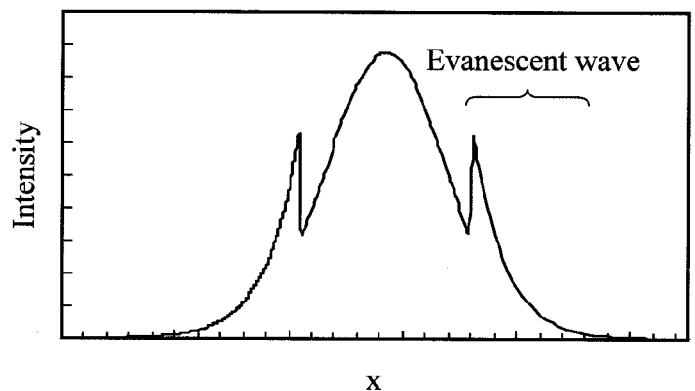
FIG. 6A is a diagram illustrating a light intensity distribution in a waveguide.
Figure 6B:
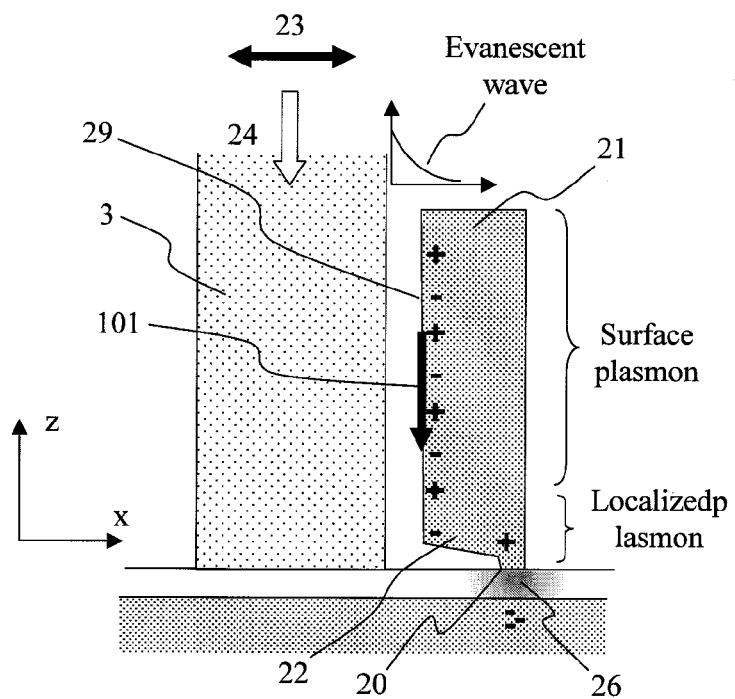
FIG. 6B is a diagram illustrating locations where a surface plasmon and a localized plasmon are generated.
Figure 6C:
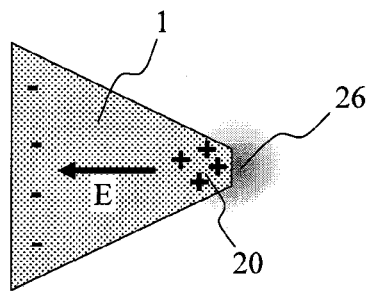
FIG. 6C is a diagram illustrating a principle of a localized plasmon.

As illustrated in FIG. 3, the core 3 of the waveguide is arranged beside the metallic structure 1. As illustrated in FIG. 6A, an evanescent light that is generated so as to exude to the clad 15 exists on an interface of the core 3 and the clad 15 of the waveguide. When the evanescent light strikes a lateral face 29 of an upper part 21 of the metallic structure 1, as illustrated in FIG. 6B, a surface plasmon 101 that is a compression wave of charges is generated on an interface 29 of the metallic structure 1 and the clad 15. When the wave advances downward (in a direction heading toward a tip 20 of the metallic structure 1) and reaches a narrowed lower part 22 on a lower side of the metallic structure 1, a localized plasmon is generated at the lower part 22. In other words, due to a charge oscillation by the surface plasmon, charges at the narrowed lower part 22 of the metallic structure 1 is moved and a polarization of charges such as that illustrated in FIG. 6C occurs at the lower part. Due to the polarized charges, a depolarizaion field E is generated within the metal and, due to the field, the charges are subjected to a force (restoring force) that attempts to restore the charges to their original positions. Due to the force, a charge oscillation occurs inside the metal. An intense charge oscillation (localized plasmon) occurs when a resonance frequency of the oscillation and a vibration frequency of incident light are consistent. The charges oscillating the inside of the metal gather at the sharp-pointed tip 20 and a localized electromagnetic field or, in other words, an optical near-field is generated in the vicinity of the tip 20. In particular, when the recording medium 14 exists in the vicinity of the optical near-field element 1, interaction occurs with image charges in the medium. Therefore, charges in the metal are further attracted toward the side of the medium and an intense optical near-field is generated at the vertex 20 near the medium.

In the structure described above, in order to excite a surface plasmon on the interface of the metallic structure 1 and the clad 15, a light having an electrical field component perpendicular to the interface must be irradiated on a lateral face of the metallic structure 1. This is due to the fact that, generally, in order to excite a surface plasmon on a metallic film surface, a light having an electrical field component perpendicular to the film surface must be incident to the film. To do so, a polarization direction of light introduced into the waveguide core 3 must be a direction perpendicular to the interface of the metallic structure 1 and the clad 15 (the direction indicated by the arrow 23 in FIG. 6B).

In the structure described above, the width of the upper part 21 of the metallic structure 1 as seen from a lateral face of the slider is adapted to become gradually narrower toward the bottom face (the face on the side of the air-bearing surface) of the slider. Such an arrangement causes surface plasmon generated on the upper part 21 of the metallic structure 1 to gather at the narrowed lower part 22 on the lower side of the metallic structure 1. As a result, electromagnetic field intensity increases at the lower part of the metallic structure 1 and a generation efficiency of an optical near-field generated at the vertex 20 can be increased.

In the structure described above, at a part 25 (refer to FIG. 2) other than the vertex 20 on a medium-side surface of the metallic structure 1, a distance between the surface of the scatterer and the medium surface is adapted to be greater than a distance between the vertex 20 of the scatterer and the medium surface. When light is incident to the scatterer, in addition to the vertex 20, a weak optical near-field (background light) is also generated on a side opposite to the vertex. When the background light strikes the medium, the medium is inadvertently heated at parts other than the vertex 20 and may result in recorded information being erased at such parts. As described above, by grinding the bottom face 25 of the metallic structure 1 so that a distance between the bottom face 25 of the metallic structure 1 and the medium surface increases, a weak optical near-field generated on the side opposite to the vertex 20 can be prevented from reaching the medium surface and the influence of the optical near-field on the medium can be reduced. In the present example, an amount of depression (recess) $h_2$ of the bottom face 25 is set to 10 nm (refer to FIG. 3).

Figure 7:
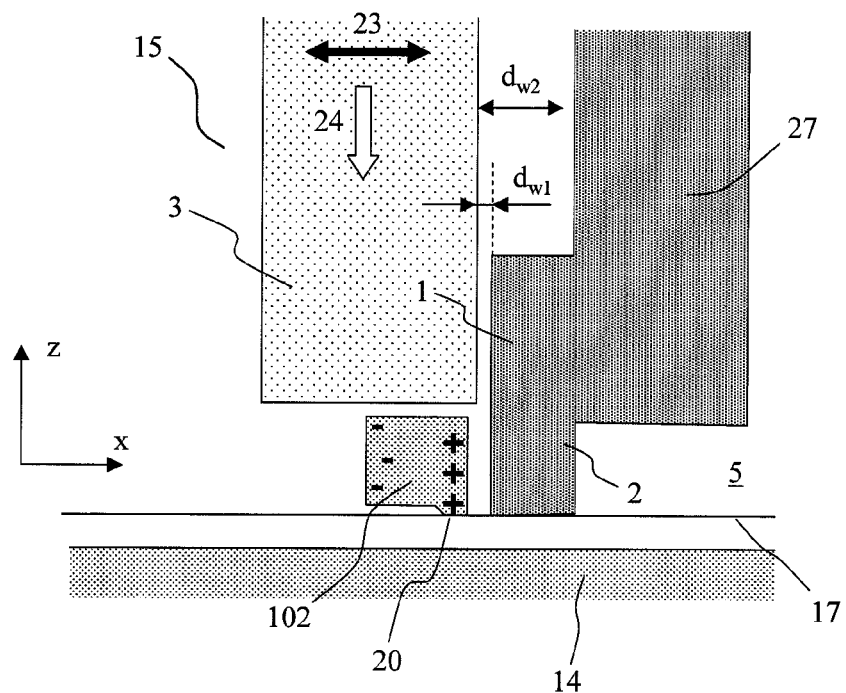
FIG. 7 is a diagram illustrating a conventional optical near-field generating element.

FIG. 7 illustrates an optical near-field generating element using a conventional metallic scatterer. The structure according to the present invention has the following advantages over the conventional example.

(1) In the conventional example, a metallic scatterer 102 is arranged at a lower part of a waveguide core 3 and a localized plasmon is directly excited by outgoing light from the waveguide core 3. In comparison, in the present invention, a surface plasmon is excited by light from a waveguide. Since the upper part 21 of the metallic structure 1 acts to gather the surface plasmon, the intensity of a localized plasmon generated at the lower part 22 of the metallic structure 1 can be increased. As a result, optical near-field generating efficiency can be increased and the power of a light source necessary for recording can be reduced. Consequently, power consumption can be reduced.

(2) In the conventional example, a shape of the scatterer 102 is adapted to be uniform with respect to a traveling direction of light. For example, when arranging a shape of the scatterer as seen from a side of the air-bearing surface to be triangular, the scatterer is formed as a triangular prism. In comparison, in the present invention, a width of the metallic structure 1 as seen from a lateral face of the slider is arranged so as to increase toward an upper part. As a result, a cubic volume of the optical near-field generating element increases and heat radiating performance is improved. Consequently, a temperature of the optical near-field generating element can be lowered.

(3) In the present invention, since the waveguide core 3 is arranged beside the metallic structure 1, distances ($d_{w1}$ and $d_{w2}$ in the drawing) between magnetic poles 2 and 27 and the waveguide core 3 become greater than in the conventional example. When a magnetic pole exists near the waveguide core, an evanescent light component that exudes to the clad is absorbed by the magnetic core and propagation loss occurs. By increasing the distances between the waveguide core and the magnetic poles as in the present invention, the influence of the magnetic poles can be reduced. As a result, a transmission efficiency of the waveguide can be increased and the power of the light source necessary for recording can be reduced.

Details of materials, sizes, shapes, and the like of the optical near-field generating element according to the present invention will now be described.

In the present example, gold is used as a material of the metallic structure 1 while alumina ($Al_2O_3$) is used as a material of a periphery of the metallic structure 1. Any conductive material may be used as the material for the metallic structure 1 and, for example, a metal such as silver, copper, aluminum, platinum, and alloys may be used. A semiconductor may be used instead of metal. However, in order to generate an intense optical near-field, a highly-conductive metal material such as gold, silver, copper, aluminum, or an alloy combining such metals is favorably used. A dielectric material is to suffice as the material of the periphery of the metallic structure 1 and $SiO_2$, SiN, SiC, or magnesium fluoride may be used.

The material constituting the metallic structure 1 may be adapted to partially differ from other parts. For example, in the example illustrated in FIG. 8, a layer 42 whose material differs from other parts is formed on the vertex 20 where an optical near-field is generated. A material with a greater hardness than the material of the main body is used for the layer 42. Such an arrangement enables the vertex 20 where an optical near-field is generated to become more resistant to damage when the recording head collides with the recording medium due to an impact applied to the device or the like. In addition, by using a high-melting-point material for the tip, when the temperature of the vertex 20 where an optical near-field is generated rises, melting of the vertex 20 can be prevented. In the present example, gold is used as the material of parts other than the vertex 20, and tungsten is used as the material of the layer 42 made of a different material than others. Instead of tungsten, other metals such as molybdenum, chrome, titanium, and platinum may be used as the material of the tip.

Figure 9:
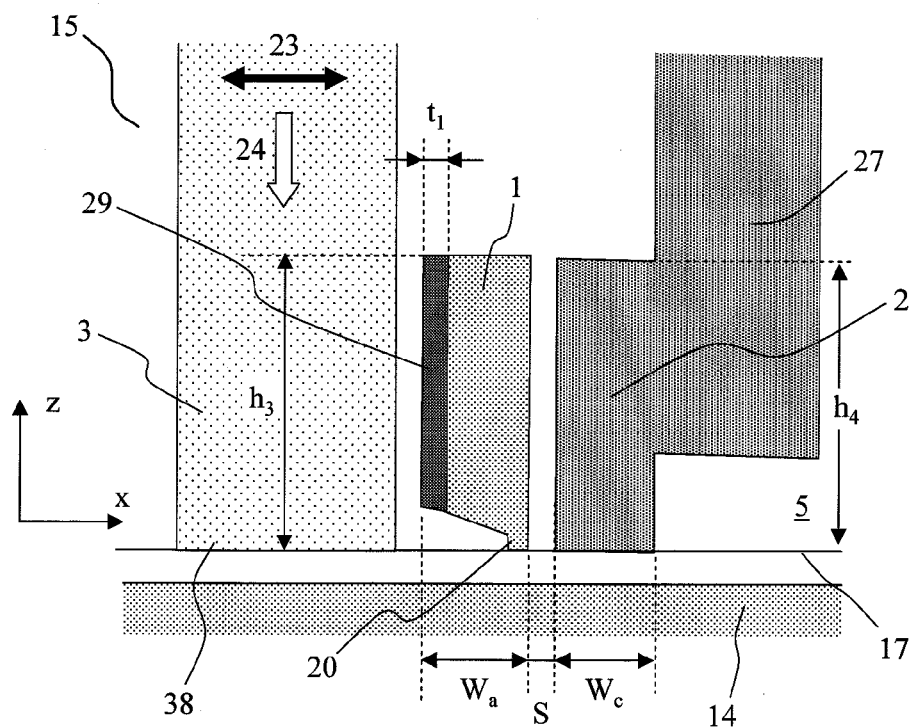
FIG. 9 is a diagram illustrating an example of a metallic structure in which a material of a lateral face on the side of the waveguide has been altered from materials of other parts.

FIG. 9 illustrates an example in which a material of the lateral face 29 of the metallic structure 1 at which a surface plasmon is generated is adapted to partially differ from other parts. In the present example, silver is used as a material of the lateral face 29 and gold is used as a material for other parts. Since a value of an imaginary part of the dielectric constant of silver is small, by using silver as the material of the lateral face, the intensity of the surface plasmon generated on the lateral face 29 can be increased. While silver may be used as the material for the entire metallic structure 1, such an arrangement is susceptible to oxidation and also to corrosion.

Therefore, silver is used only for the lateral face 29 where a surface plasmon is generated and gold is used for other parts including as the vertex 20.

Figure 10:
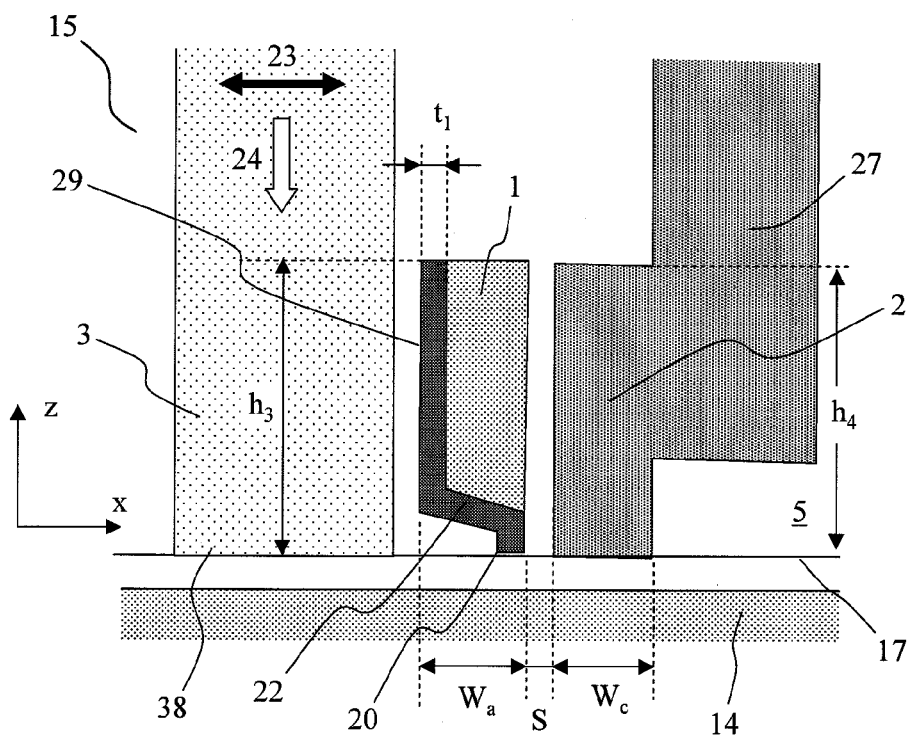
FIG. 10 is a diagram illustrating an example of a metallic structure in which materials of the vertex where an optical near-field is generated and the lateral face on the side of the waveguide have been altered from materials of other parts.

FIG. 10 illustrates an example in which a material of the lateral face 29 of the metallic structure 1 at which a surface plasmon is generated, the lower part 22 of the metallic structure 1, and the vertex 20 where an optical near-field is generated is adapted to differ from other parts. In the present example, gold is used as the material of the lateral face 29, the lower part 22, and the vertex 20 where an optical near-field is generated, and copper is used for other parts. In order to generate an intense optical near-field, a highly-conductive noble metal material such as gold is favorably used at portions where a surface plasmon and a localized plasmon are generated. However, in consideration of workability and cost, other materials such as copper, chrome, tungsten, and aluminum may be used for portions other than the portions where a surface plasmon and a localized plasmon are generated.

While alumina ($Al_2O_3$) is used as the material of the periphery of the metallic structure 1 in the example described above, other materials such as $SiO_2$, SiN, and $MgF_2$ may be used instead.

A spot diameter of an optical near-field is dependent on a width $W_b$ (refer to FIG. 4) of the vertex 20 where an optical near-field is generated. The spot diameter of the optical near-field is approximately equal to the width $W_b$ of the vertex 20 at which the optical near-field is generated, and the width $W_b$ must be set narrower than the width of the recording track. While the necessary width $W_b$ is dependent on recording density and a bit aspect ratio (a ratio of widths in a down track direction and a cross track direction) of a recorded bit, in the present example, the width $W_b$ is set to 10 to 30 nm with respect to a recording density of 1 to 2.5 $Tb/in^e$.

While a vertex angle ($\theta_1$ in FIG. 4) of the vertex where an optical near-field is generated may be set to 0 (a rectangular cross section may be adopted instead of a triangular cross section), when light use efficiency is taken into consideration, the vertex angle is favorably greater than 0. In other words, since charges over a wider area can be gathered at the vertex by widening the angle, a more intense optical near-field can be generated. In the present example, the vertex angle $\theta_1$ is set to 60 degrees. The angle may alternatively be set to another value such as 20 degrees or 90 degrees.

Figure 12:
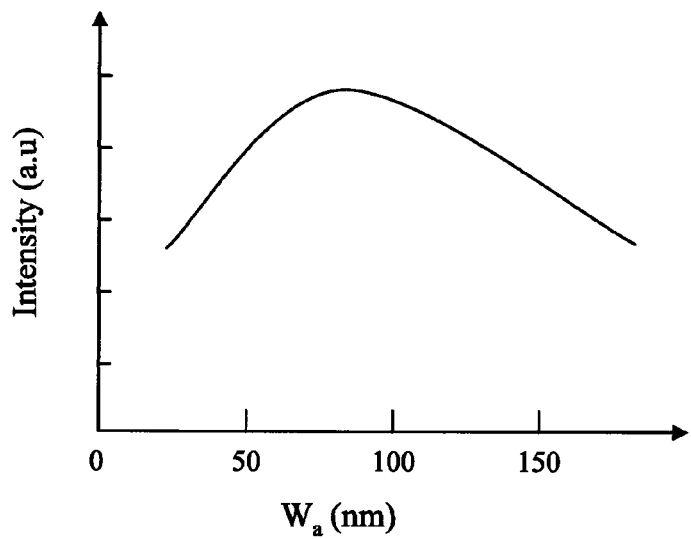
FIG. 12 is a diagram illustrating a relationship between a width of a lower part of the metallic structure in a direction parallel to a polarization direction and optical near-field intensity.

A resonance condition of a localized plasmon is dependent on a width $W_a$ (refer to FIG. 4) of the metallic structure 1 in the x direction. Therefore, the width $W_a$ must be adjusted so as to ensure the generation of a localized plasmon. For example, FIG. 12 is a diagram illustrating a relationship between the width $W_a$ and optical near-field intensity when the material of the metallic structure 1 is gold and the wavelength of incident light is 780 nm. As illustrated in the diagram, a localized plasmon is generated and optical near-field intensity is maximum when the width $W_a$ is set to 80 nm. Therefore, in the present example, the width $W_a$ is set to 80 nm. In addition, the longer the wavelength, the greater the optimal value of the width $W_a$. For example, the width $W_a$ is set to 100 nm when the wavelength is 980 nm.

Figure 13:
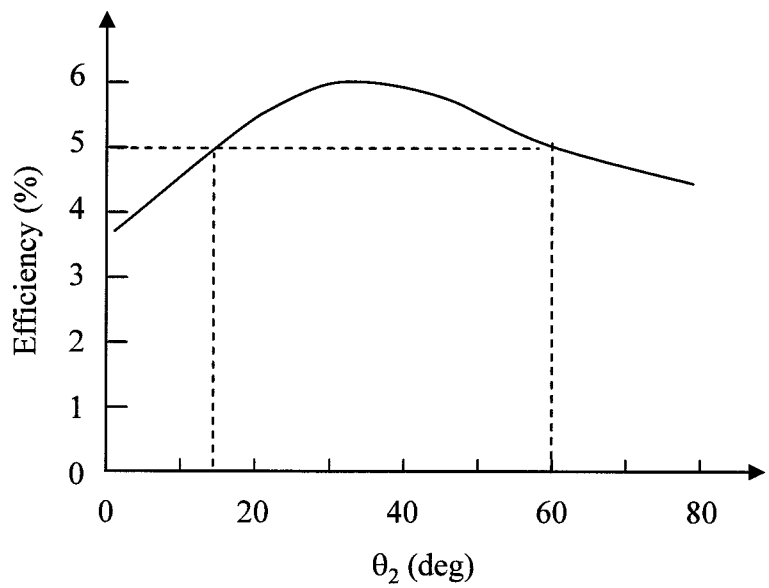
FIG. 13 is a diagram illustrating a relationship between taper angle and optical near-field generating efficiency.

FIG. 13 is a diagram illustrating a relationship between a spread angle $\theta_2$ of the widened portion of the upper part 21 of the metallic structure 1 and light use efficiency. In this case, the wavelength of incident light is set to 780 nm, a height $h_3$ of the metallic structure to 900 nm, the width $W_a$ in the x direction to 80 nm, and a distance $d_x$ between the waveguide core 3 and the metallic structure 1 to 40 nm. For the lower part 22 of the metallic structure 1, a y-direction width is set constant, and a tapered part is adapted to be formed at a portion where a height from the air-bearing surface is equal to or greater than 150 nm (a portion where $h_6$ in FIG. 2 is equal to or greater than 150 nm). Light use efficiency represents a ratio of the power of light incident to the metallic structure 1 and a heat quantity absorbed by the recording medium in the vicinity of the vertex 20 where an optical near-field is generated. A medium using FePt as a material of a recording layer is used as the recording medium. As illustrated in the drawing, a wider metallic structure upper part 21 results in a higher light use efficiency as compared to a case where the metallic structure upper part is not widened ($\theta_2=0$). As shown, the improvement in efficiency when the angle is widened is conceivably due to the fact that widening the upper part results in a wider contact area between the metallic structure lateral face 29 and the waveguide lateral face and, in turn, a wider area over which surface plasmon is generated. On the other hand, conversely, excessively increasing the spread angle $\theta_2$ lowers light use efficiency. This is conceivably due to the fact that an excessively large spread angle $\theta_2$ makes it difficult for surface plasmon to gather at the metallic structure lower part 22 and, in turn, reduces efficiency.

In order to increase recording density, a diameter of particles that make up the medium must be reduced to keep a signal-to-noise ratio of a reproducing signal at a sufficient value. When particle diameter is reduced, a coercive force of the medium must be increased in order to suppress the influence of thermal fluctuation. In addition, generally, since the greater the coercive force of a medium, the higher the Curie temperature, a heating temperature of the medium must be further increased. In order to achieve a recording density of 2.5 $Tb/in^2$ or higher, the temperature of the medium must be raised to approximately 250° C. or higher which, in turn, requires a light use efficiency of 5% or higher. As illustrated in FIG. 13, by setting the spread angle $\theta_2$ from 15 degrees to 60 degrees, inclusive, a light use efficiency of 5% or higher can be achieved.

Moreover, in the example described above, at the lower part 22 of the metallic structure 1, a y-direction width is set constant in the z direction and the height $h_6$ of a portion with a constant y-direction width is set to 150 nm. This arrangement is intended to reduce the influence of machining error. In other words, while the height $h_3$ of the metallic structure may potentially vary due to errors in the amount of polishing performed during machining, unless a portion whose width is constant in the z direction is not provided, the width $W_b$ (refer to FIG. 4) of the metallic structure tip 20 as seen from the slider air-bearing surface varies. As a result, a spot diameter of a generated optical near-field varies. In order to prevent such an occurrence, a portion whose y-direction width is constant regardless of the z-direction position is provided at the bottom of the metallic structure. If machining error is minor, the height $h_6$ of the portion whose y-direction width is constant may be set smaller than 150 nm to, for example, 50 nm or 100 nm. In the present example, the spread angle $\theta_2$ is set to 35 degrees and the height $h_6$ of a portion 21 at the bottom of the metallic structure whose y-direction width is constant is set to 100 nm.

Figure 14:
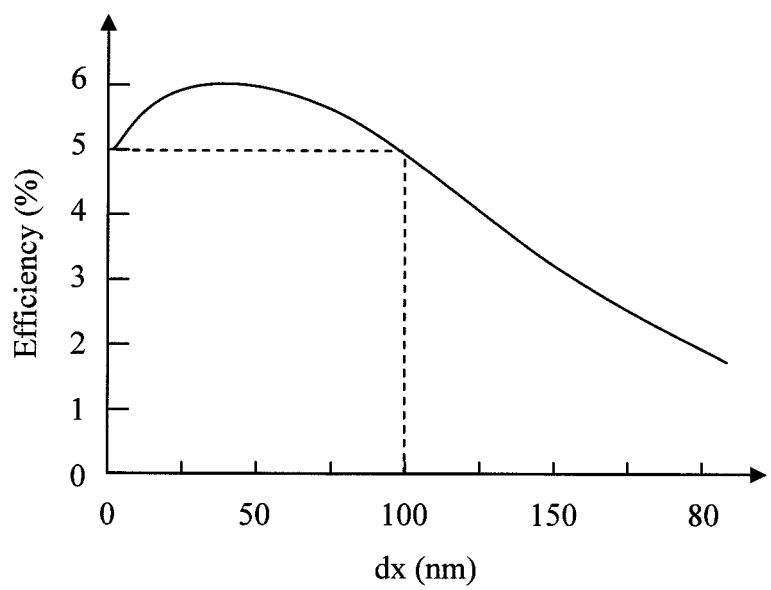
FIG. 14 is a diagram illustrating a relationship between a distance from the waveguide to the metallic structure and optical near-field generating efficiency.

FIG. 14 illustrates a relationship between the distance $d_x$ from the waveguide core 3 to the metallic structure 1 and light use efficiency. In this case, the wavelength of incident light is set to 780 nm, the height $h_3$ of the metallic structure to 900 nm, the width $W_a$ in the x direction to 80 nm, and the spread angle $\theta_2$ to 35 degrees. As shown, light use efficiency decreases as the distance $d_x$ increases. This is conceivably due to the fact that an intensity of evanescent light exuded to the clad 15 decreases exponentially with distance from the core 3, and the greater the distance d, the lower the intensity of an excited surface plasmon. As illustrated in the drawing, in order to achieve a light use efficiency of 5% that is required to achieve a recording density of 2.5 Tb/in² or higher, the distance $d_x$ is favorably set from 0 to 100 nm, inclusive. In the present example, the distance $d_x$ is set to 30 nm. Moreover, a decrease in efficiency when the distance $d_x$ is set to 0 is conceivably due to the fact that the clad layer 15 can no longer be provided between the core 3 and the metallic structure 1 and a propagation mode of the waveguide varies as the core 3 comes into contact with the metallic structure 1.

Figure 15A:
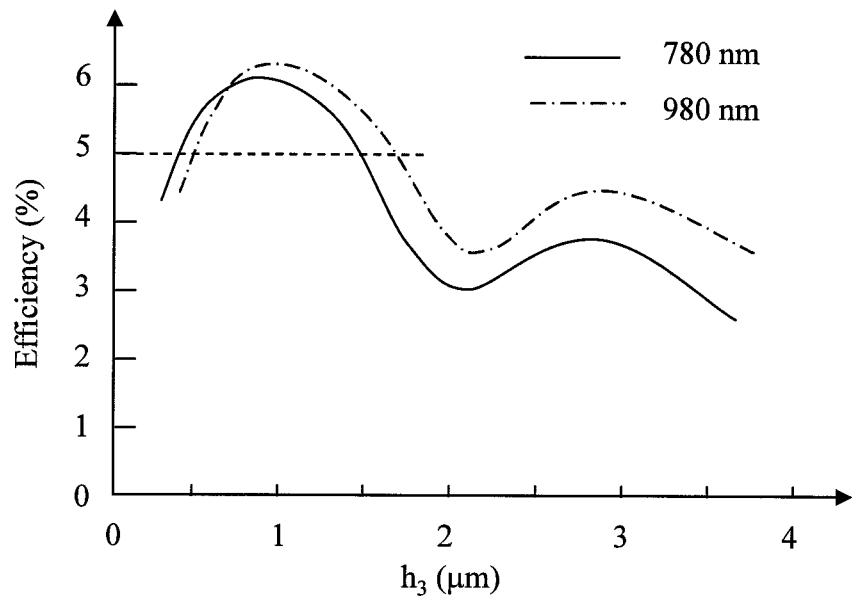
FIG. 15A is a diagram illustrating a relationship between a height of the metallic structure and optical near-field intensity for each wavelength.

FIG. 15A is a diagram illustrating a relationship between the height $h_3$ of the metallic structure 1 and light use efficiency. In this case, the x-direction width $W_a$ is set to 80 nm, the spread angle $\theta_2$ to 35 degrees, and the distance $d_x$ between the waveguide core 3 and the metallic structure 1 to 30 nm. The solid line represents a relationship when the wavelength is 780 nm and the dashed-dotted line represents a relationship when the wavelength is 980 nm. The drawing shows that light use efficiency increases at a given period. When the optical waveguide and the metallic structure 1 are in contact with each other, while the energy of light in the waveguide is converted to energy of the surface plasmon, conversely, the energy of the surface plasmon may also be converted into energy of light in the waveguide. While an appropriate length (=$h_3$) of an overlapping portion of the waveguide core and the metallic structure enables light energy to be efficiently converted into surface plasmon energy, an inappropriate length of the overlapping portion results in light once coupled to the surface plasmon returning to the waveguide.

In such a state, a proportion of light in the waveguide that is coupled to a surface plasmon periodically varies with respect to length. In other words, if Lc denotes a minimum value of an optimal length that enables efficient coupling of light in the waveguide to a surface plasmon (Coupling length), light in the waveguide efficiently couples to a surface plasmon when the length is mLc (where m is an integer equal to or greater than 1). In FIG. 15A, the coupling length (Lc=$h_3$) is approximately 900 nm when the wavelength is 780 nm and the coupling length (Lc) is approximately 950 nm when the wavelength is 980 nm. Moreover, the light use efficiency when $h_3$=2Lc is lower than the light use efficiency when $h_3$=Lc. This is due to the fact that an increase in the height $h_3$ causes intensity to attenuate due to loss during the propagation of a surface plasmon generated at the upper part of the metallic structure 1 to the lower part. Therefore, while $h_3$ may be set to around 2Lc, in order to achieve high light use efficiency, $h_3$ is favorably set to around Lc.

Figure 16:
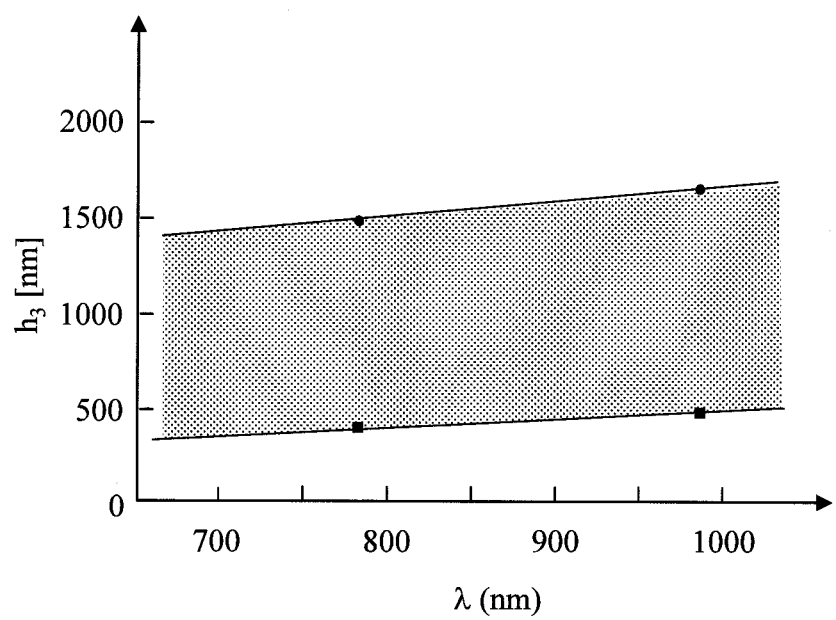
FIG. 16 is a diagram illustrating a relationship between an optimal range of the height of the metallic structure and incident light wavelength.

While a light use efficiency of 5% or higher is required to achieve a recording density of 2.5 Tb/in² or greater, in order to do so, the height $h_3$ is favorably set to a range from 400 nm to 1500 nm, inclusive, when the wavelength is 780 nm as illustrated in FIG. 16. An optimal range is dependent on wavelength and the longer the wavelength, the larger the optimal value. FIG. 16 illustrates a relationship between the optimal range of the height $h_3$ of the metallic structure 1 and wavelength. The dots represent maximum values of the optimal range and the squares represent minimum values of the optimal range. If $\lambda$ denotes a wavelength of incident light, then the optimal range may be expressed using an approximation formula as follows (unit: nm).

$$\frac{\lambda}{2} + 10 \leq h_3 \leq \lambda + 720 \tag{3}$$

Figure 11:
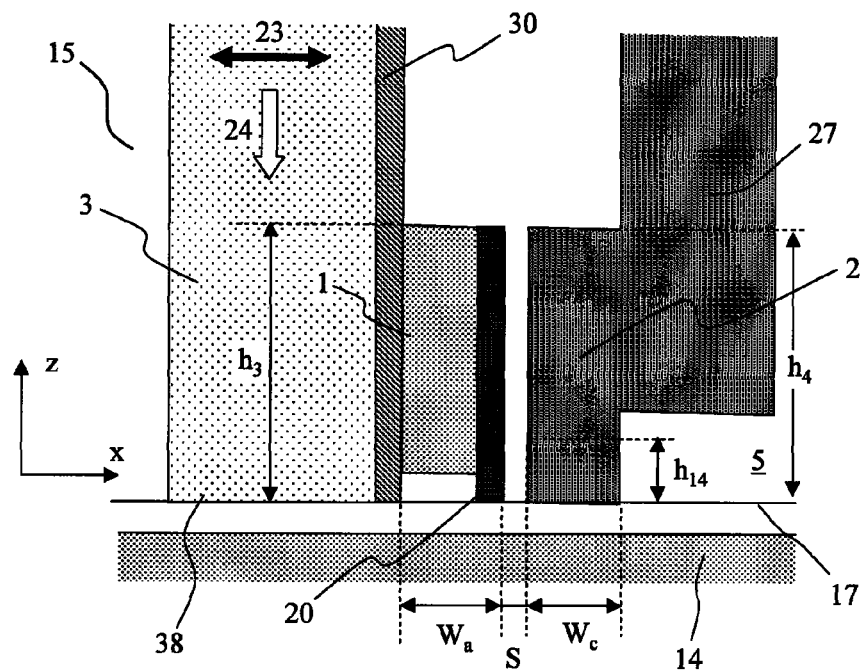
FIG. 11 is a diagram illustrating an example of a metallic structure in which a material of a dielectric body between the metallic structure and the waveguide has been altered from materials of other parts.
Figure 15B:
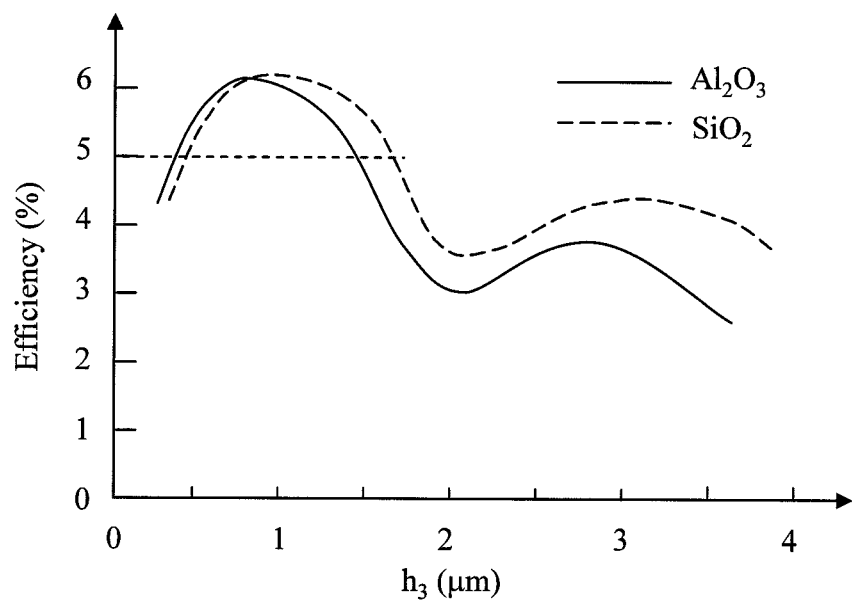
FIG. 15B is a diagram illustrating a relationship between a height of the metallic structure and optical near-field intensity when a material of a periphery of the metallic structure has been altered.

As illustrated in FIG. 11, the optimal range of the height $h_3$ of the metallic structure 1 varies when the material 30 between the waveguide core 3 and the metallic structure 1 is changed. FIG. 15B illustrates a relationship between the height $h_3$ of the metallic structure 1 and optical near-field intensity when the wavelength is 780 nm and the material 30 between the waveguide core 3 and the metallic structure 1 is changed from $Al_2O_3$ (refractive index=1.63) to $SiO_2$ (refractive index=1.45). The solid line represents the case of $Al_2O_3$ and the dashed line represents the case of $SiO_2$. As shown, when the refractive index of the peripheral material decreases, the optimal value of the height $h_3$ of the metallic structure 1 increases. When the wavelength is 780 nm, a ratio of an optimal value in the case of $Al_2O_3$ and an optimal value in the case of $SiO_2$ is 1.14. A study of differences in optimal values for wavelengths other than 780 nm revealed that a ratio of an optimal value in the case of $Al_2O_3$ and an optimal value in the case of $SiO_2$ is approximately 1.14. Therefore, the optimal range in the case of $SiO_2$ can be obtained by multiplying the expression (3) above by 1.14. When a peripheral material other than $Al_2O_3$ and $SiO_2$ is used, if n denotes a refractive index of the material, then an optimal range can be approximated by multiplying the expression (3) with $$\frac{1.14 - 1}{1.45 - 1.63} \times (n - 1.63) + 1 = \tag{4}$$
$$-0.778 \times (n - 1.63) + 1 = -0.778n + 2.268$$

In other words, the optimal range can be expressed as $$\left(\frac{\lambda}{2} + 10\right) \times (-0.778n + 2.268) \leq h_3 \leq (\lambda + 720) \times (-0.778n + 2.268) \tag{5}$$

Since the optimal range of the aforementioned height $h_3$ is, in principle, dependent on the material of the metallic structure 1, a range must be recalculated for a different material. However, when silver and copper is used near a wavelength of 780 nm or 980 nm, the optimal range is approximately equal to expression (5) above.

While the taper angle $\theta_2$ of the upper part 21 of the metallic structure 1 is adapted to be constant in the example described above, as illustrated in FIG. 17A, the taper angle may alternatively be spread in multiple stages. Such an arrangement increases an area of the lateral face of the metallic structure 1 and enables surface plasmon to be excited across a wider area, and by gathering the surface plasmon, the surface plasmon intensity at the lower part 22 of the metallic structure 1 can be increased. In other words, light use efficiency can be improved. In addition, since the cubic volume of the metallic structure 1 increases, heat radiating performance also improves and the heating temperature of the element decreases. In the present example, the taper angle is spread in two stages, in which case a lower-side taper angle $\theta_2$ is set to 35 degrees and an upper-side taper angle $\theta_3$ is set to 60 degrees. A height $h_7$ of a portion in which the taper angle is varied is set to 250 nm.

Figure 17A:
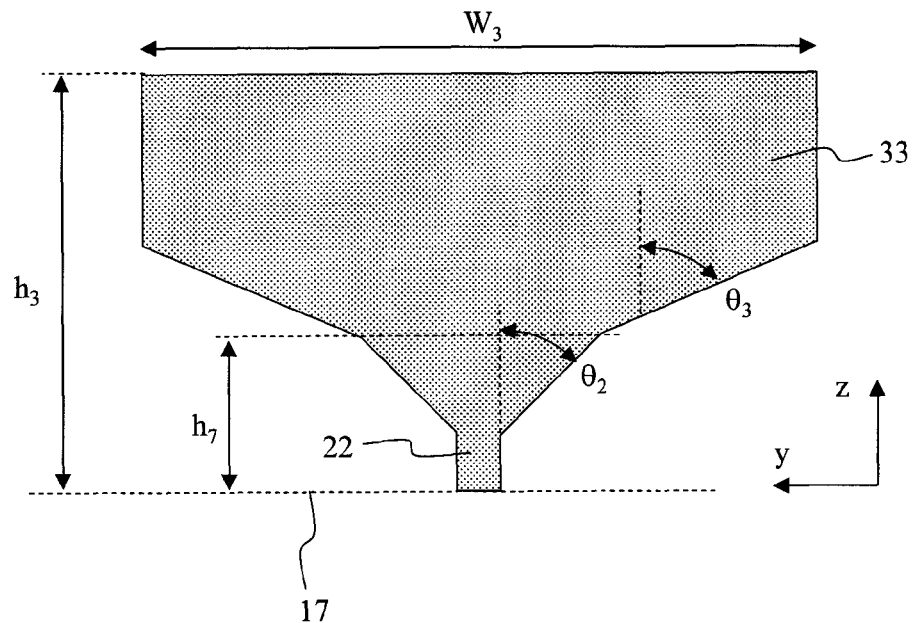
FIG. 17A is a diagram of an example of a metallic structure whose taper angle has been varied in two stages.
Figure 17B:
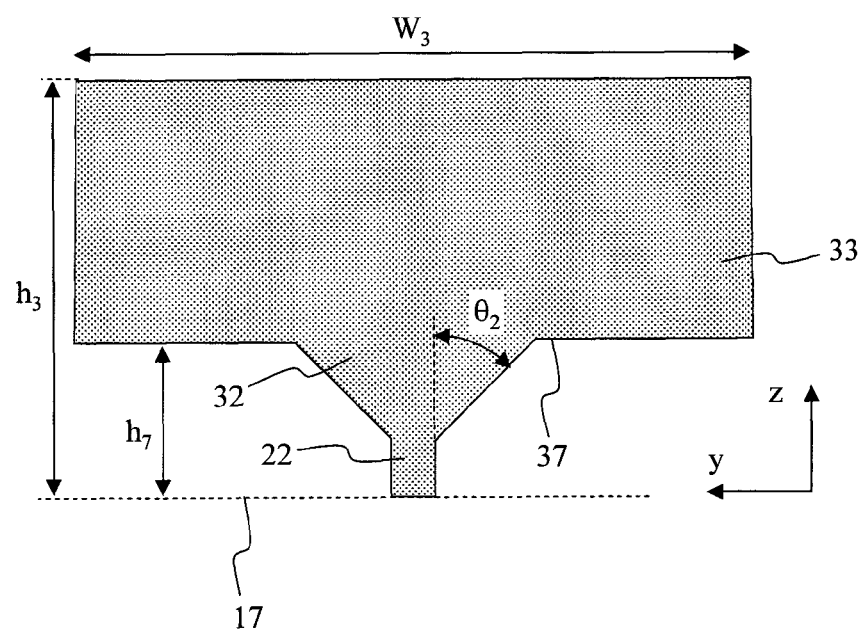
FIG. 17B is a diagram of an example of a metallic structure in which an upper part is shaped in a rectangle.

As illustrated in FIG. 17B, the upper part of the metallic structure may be shaped as a rectangle as seen from the side. In other words, the metallic structure may have an end face that is approximately parallel to the air-bearing surface on the side of the air-bearing surface. Such an arrangement enables the area of the metallic structure 1 to be increased and, in turn, enables the area over which a surface plasmon is generated to be further expanded. In addition, since the cubic volume of the metallic structure 1 increases, heat radiating performance further improves and the heating temperature of the element decreases.

Figure 18:
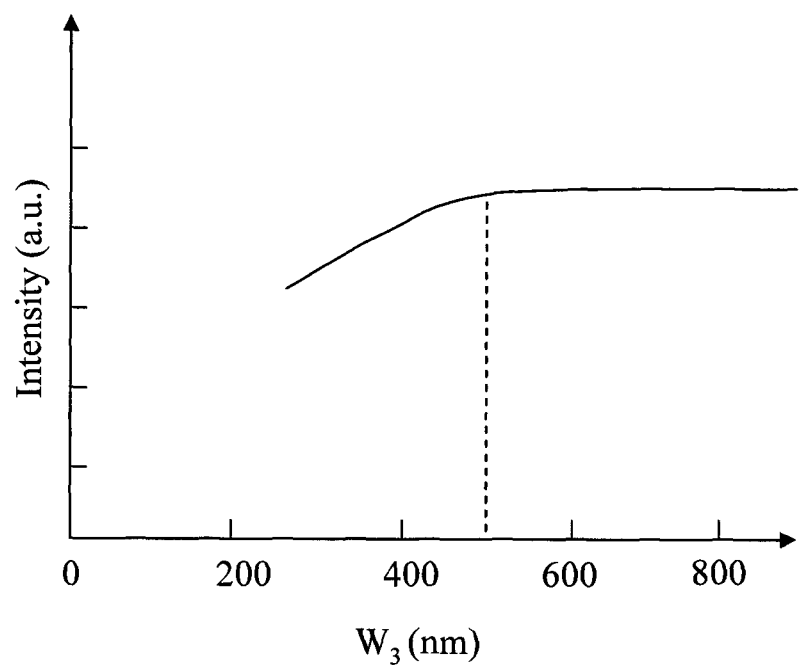
FIG. 18 is a diagram illustrating a relationship between a width of the upper part of the metallic structure and optical near-field intensity.

FIG. 18 illustrates a relationship between a width $W_3$ of the upper part of the metallic structure 1 and the intensity of an optical near-field generated on the vertex 20 when the upper part width $W_3$ is expanded as illustrated in FIGS. 17A and 17B. As illustrated in the drawings, the greater the upper part width $W_3$, the greater the optical near-field intensity. In addition, the optical near-field intensity becomes approximately constant beyond a certain value. The width at which the optical near-field intensity becomes constant is approximately equal to the width $W_1$ of the waveguide core 3. This is conceivably due to the fact that while a greater upper part width $W_3$ increases the area of a region in which surface plasmon is excited and therefore increases optical near-field intensity, when the upper part width $W_3$ exceeds the width $W_1$ of the waveguide core, since an evanescent light does not exist outside the waveguide core 3, the size of a region in which surface plasmon is excited does not increase and intensity becomes constant. Moreover, from the perspective of heat radiating performance, the upper part width $W_3$ is favorably increased as much as possible. From the above, the upper part width $W_3$ is favorably greater than the width of the waveguide core 3. In the present example, the upper part width $W_3$ is set to 10 μm.

Figure 19A:
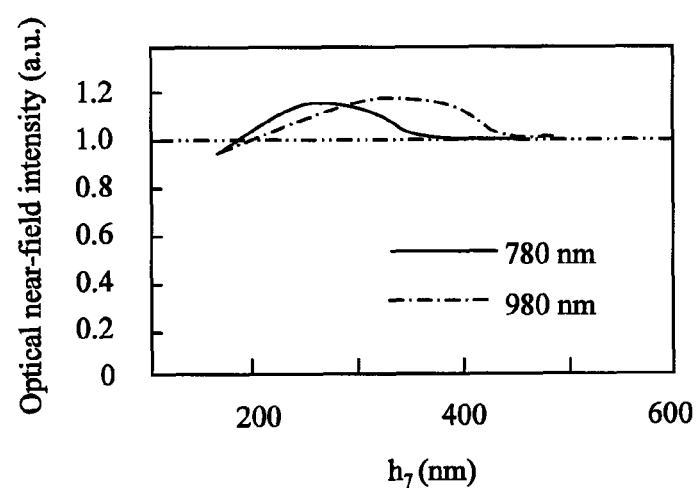
FIG. 19A is a diagram illustrating a relationship between a distance from a widened portion of the metallic structure to a air-bearing surface and optical near-field intensity for each wavelength.

FIG. 19A illustrates a relationship between the distance $h_7$ from the slider air-bearing surface to a lower part 37 of a widened portion 33 and optical near-field intensity when the upper part of the metallic structure 1 is shaped as a rectangle as illustrated in FIG. 17B. In this case, the height $h_3$ of the metallic structure is set to 900 nm, the height $h_6$ of a constant-width portion of the metallic structure lower part 22 is set to 100 nm, and the width $W_3$ of the metallic structure upper part is set to 10 μm. The solid line represents a case where the wavelength is 780 nm and the dashed line represents a case where the wavelength is 980 nm. The drawing shows that optical near-field intensity is high when the distance $h_7$ is within a certain value range. For example, when the wavelength is 780 nm, optical near-field intensity becomes approximately constant if the distance $h_7$ from the slider air-bearing surface to the widened portion is 350 nm or greater. However, when the distance $h_7$ ranges from 180 nm to 350 nm, inclusive, the optical near-field intensity becomes higher than when the distance $h_7$ is equal to or greater than 350 nm. An optimal range is dependent on wavelength and the longer the wavelength, the larger the optimal value.

Figure 20:
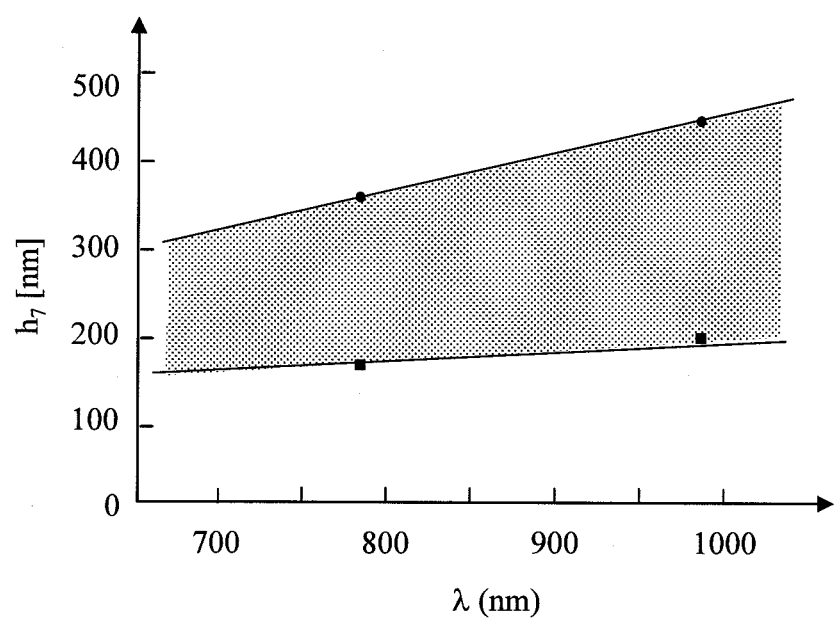
FIG. 20 is a diagram illustrating a relationship between an optimal value of a distance from a widened portion of the metallic structure to the air-bearing surface and wavelength.

FIG. 20 illustrates a relationship between the optimal range of the distance $h_7$ from the slider air-bearing surface to the widened portion and wavelength. The dots represent maximum values of the optimal range and the squares represent minimum values of the optimal range. If λ denotes a wavelength of incident light, then the optimal range may be expressed using an approximation formula as follows (unit: nm).

$$\frac{\lambda}{10} + 102 \le h_7 \le \frac{\lambda}{2} - 40 \quad (6)$$

Figure 19B:
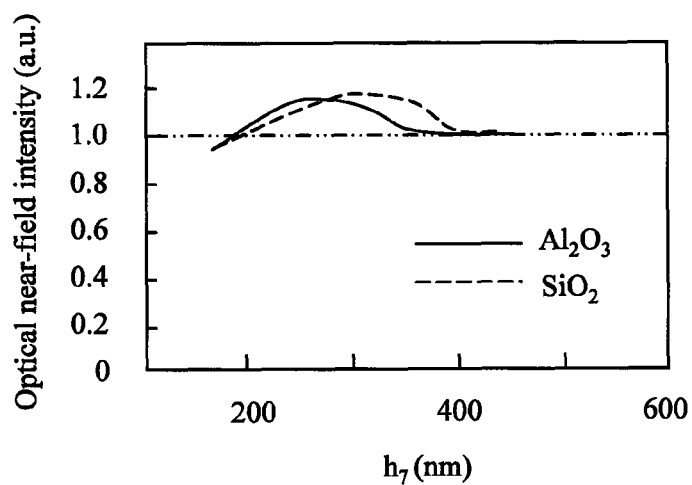
FIG. 19B is a diagram illustrating a relationship between a distance from a widened portion of the metallic structure to a air-bearing surface and optical near-field intensity after altering the material of the periphery of the metallic structure.

The optimal range of the distance $h_7$ from the slider air-bearing surface to the widened portion is dependant on the refractive index of a material of the periphery of the metallic structure 1. FIG. 19B illustrates a relationship between the distance $h_7$ and optical near-field intensity when the wavelength is 780 nm and the material of the periphery of the metallic structure is changed from $Al_2O_3$ (refractive index=1.63) to $SiO_2$ (refractive index=1.45). The solid line represents the case of $Al_2O_3$ and the dashed line represents the case of $SiO_2$. As shown, when the refractive index of the peripheral material decreases, the optimal value of the distance $h_7$ increases. When the wavelength is 780 nm, a ratio of an optimal value in the case of $Al_2O_3$ and an optimal value in the case of $SiO_2$ is 1.14. A study of differences in optimal values for wavelengths other than 780 nm revealed that a ratio of an optimal value in the case of $Al_2O_3$ and an optimal value in the case of $SiO_2$ is approximately 1.14. Therefore, the optimal range in the case of $SiO_2$ can be obtained by multiplying the expression (6) above by 1.14. A case where a material other than $Al_2O_3$ and $SiO_2$ is used as the peripheral material can be accommodated by approximately multiplying expression (6) by expression (4). In other words, the optimal range can be expressed as $$\left(\frac{\lambda}{10} + 102\right) \times (-0.778n + 2.268) \le h_7 \le \left(\frac{\lambda}{2} - 40\right) \times (-0.778n + 2.268) \quad (7)$$

(unit: nm). Moreover, although the upper part width $W_3$ of the metallic structure 1 is set wider than the core width $W_1$ of the waveguide in the present example, expression (7) is true even when the upper part width $W_3$ of the metallic structure 1 is narrower than the core width $W_1$ of the waveguide. For example, even when the upper part width $W_3$ of the metallic structure 1 is narrower than the core width $W_1$ of the waveguide by 20%, a phenomenon in which optical near-field intensity increases when $h_7$ is in a given range such as that illustrated in FIGS. 19A and 19B is observed.

Figure 21A:
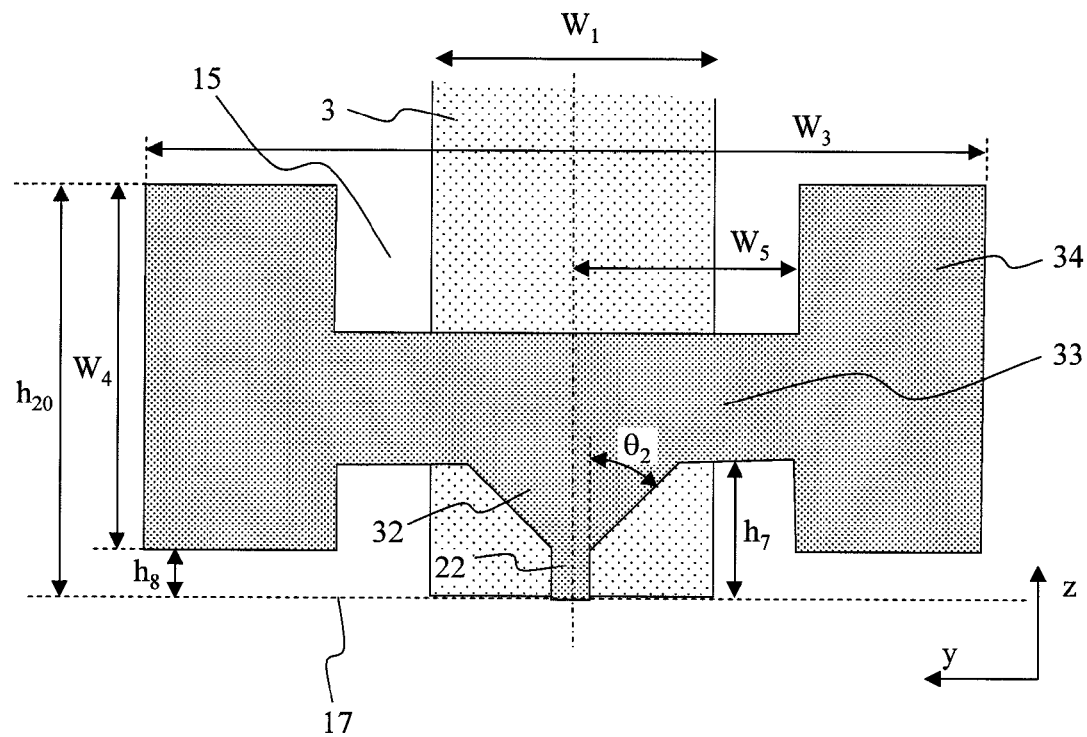
FIG. 21A is a diagram illustrating an example of a metallic structure in which vertical widths at both ends have been expanded.

As illustrated in FIG. 21A, a vertical width of the metallic structure upper part 33 may be expanded at both ends. In the present example, a vertical width $W_4$ at both ends is set to 5 μm and a distance $h_8$ from a lower part of a vertically-widened portion 34 to the air-bearing surface 17 is set to 100 nm. As shown, by expanding the vertical width of the metallic structure upper part 33 at both ends, heat radiating performance can be improved. However, at this point, when a distance $W_5$ from a center of the waveguide core 3 to the vertically-widened portion 34 is too narrow, an evanescent light that exudes to the waveguide clad 15 is scattered or absorbed by the vertically-widened portion 34 and the intensity of light propagating through the waveguide decreases. In order to prevent such an occurrence, the distance $W_5$ from the center of the waveguide core 3 to the vertically-widened portion 34 must be sufficiently long.

Figure 21B:
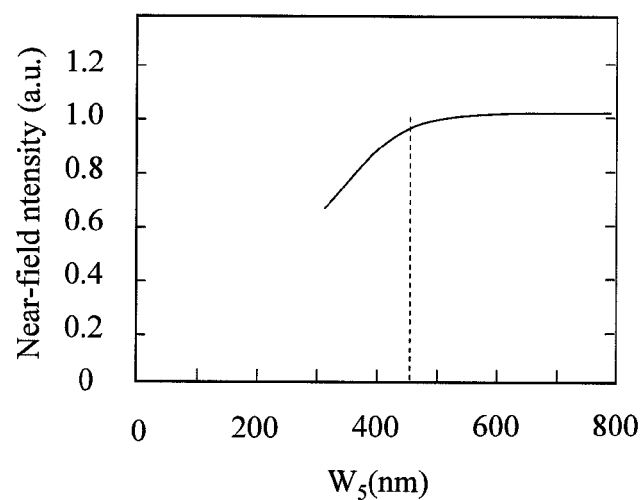
FIG. 21B is a diagram illustrating a relationship between a distance from a vertically-widened portion to the center of the waveguide and optical near-field intensity.

FIG. 21B illustrates a relationship between the distance $W_5$ from the center of the waveguide core 3 to the vertically-widened portion 34 and the intensity of an optical near-field generated at the vertex 20. In this case, the width $W_1$ of the waveguide core 3 is set to 500 nm and the width $W_3$ of the scatter upper part to 10 μm. The drawing shows that optical near-field intensity decreases when the distance $W_5$ is equal to or less than 450 nm. In other words, it is shown that the distance $W_5$ from the center of the waveguide core 3 to the vertically-widened portion 34 is favorably set to 0.9 times the width $W_1$ of the waveguide core 3 or greater.

While the distance from the center of the metallic structure 33 to the vertically-widened portion 34 is favorably set to 0.9 times the width $W_1$ of the waveguide core 3 or greater on the upper side of the metallic structure 33 as described above, in a vicinity of narrowed portions 22 and 23 of the metallic structure 33, a distance ($W_{50}$) from the center of the metallic structure 33 to the vertically-widened portion 34 may be set to less than 0.9 times the width $W_1$ of the waveguide core 3. For example, in the present example, the distance ($W_{50}$) from the center of the metallic structure 33 to the vertically-widened portion 34 in the vicinity of narrowed portions 22 and 23 of the metallic structure 33 is set so as to range from 150 to 450 nm.

Figure 22A:
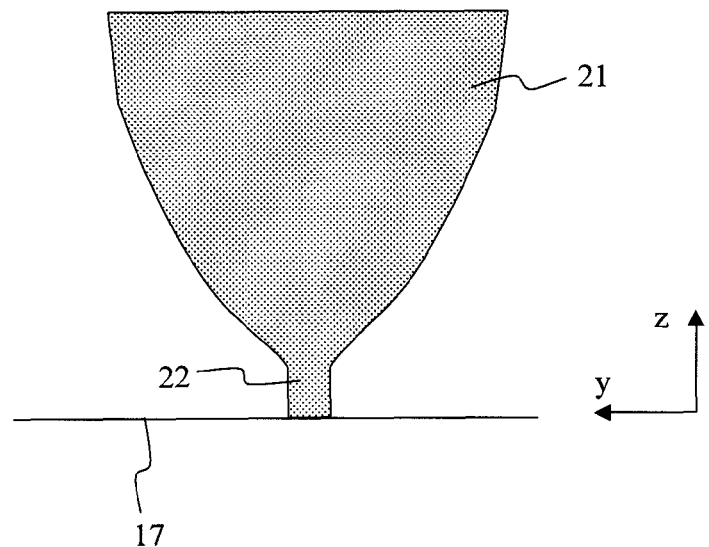
FIG. 22A is a diagram illustrating an example of a metallic structure whose upper part is given a parabolic shape.
Figure 22B:
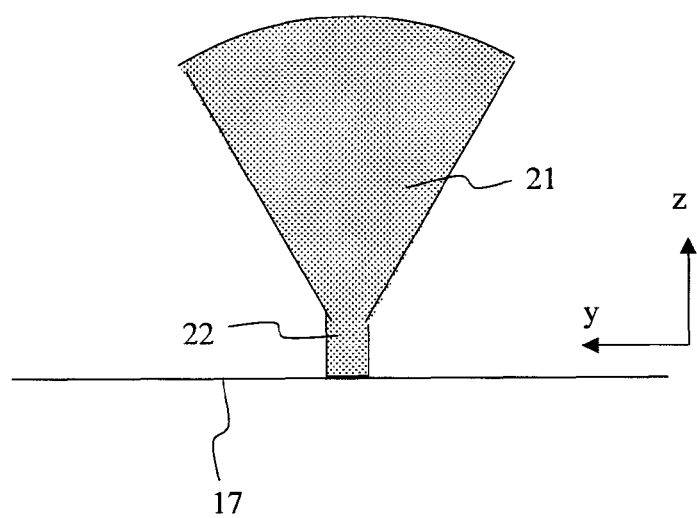
FIG. 22B is a diagram illustrating an example of a metallic structure whose upper part is given a fan shape.

When expanding the width of the metallic structure upper part, the metallic structure upper part 21 as seen from a lateral face of the slider may have a hyperbolic shape as illustrated in FIG. 22A or a fan-like shape as illustrated in FIG. 22B.

In the structure according to the present invention, a surface plasmon propagates along the waveguide-side lateral face 29 of the metallic structure 1. Therefore, a magnetic pole-side lateral face 35 on the side opposite thereto need not necessarily be in contact with a dielectric body. In the example illustrated in FIG. 23, the upper part of the main pole 2 is brought close to the side of the metallic structure 1 so that magnetic pole-side lateral face 35 of the metallic structure and the magnetic pole 2 come into contact with each other. Since such an arrangement causes heat generated by the optical near-field generating element to be transmitted to the magnetic pole-side, heat radiating performance can be improved and a temperature rise of the optical near-field generating element can be suppressed. Moreover, since a localized plasmon must be generated at the metallic structure lower part 22, the vertex 20 where an optical near-field is generated must be in contact with a dielectric body. In the present example, a height $h_{14}$ of a portion 36 in contact with the dielectric body is set to 300 nm. As long as machining precision is ensured, the height $h_{14}$ may be set even shorter to, for example, 150 nm, 50 nm, and the like.

In the example described above, while the width of the metallic structure in the x direction (the direction parallel to the polarization direction of incident light) is set constant, the width may vary at the metallic structure upper part. Since a resonance frequency of a localized plasmon is dependant on the x-direction width $W_a$ at the metallic structure lower part 22 where the localized plasmon is generated, the width $W_a$ must be adjusted according to resonance conditions. In contrast, at the metallic structure upper part, energy is transmitted along the surface of the waveguide-side lateral face 29 of the metallic structure as a surface plasmon. Therefore, at the metallic structure upper part, the width of the metallic structure in the x direction (the polarization direction of incident light) may be set so as to differ from a value that conforms to the resonance conditions of a localized plasmon.

Figure 24:
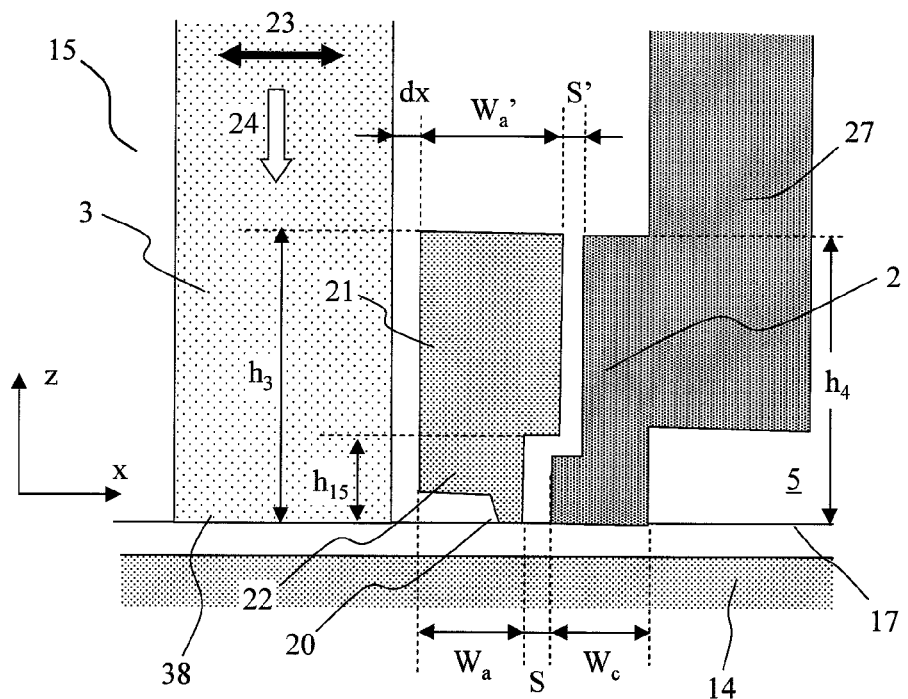
FIG. 24 is a diagram illustrating an example in which a width of an upper part of the optical near-field element in a direction parallel to a polarization direction has been widened.

FIG. 24 illustrates an example in which the thickness of the metallic structure upper part is increased so that the metallic structure bulges toward the side of the magnetic poles. The width $W_a$ at the metallic structure lower part 22 is set to 80 nm and a width $W_a'$ at the upper part 21 is set to 120 nm. A distance S' between the main pole 2 and the metallic structure upper part 21 is set to 20 nm and a width of the main pole 2 in the x direction is reduced by just the bulging amount of the metallic structure. As shown, since the cubic volume of metallic parts with high conductivity increases by expanding the x-direction width at the metallic structure upper part, heat radiating performance can be improved and a temperature rise can be suppressed.

Figure 25:
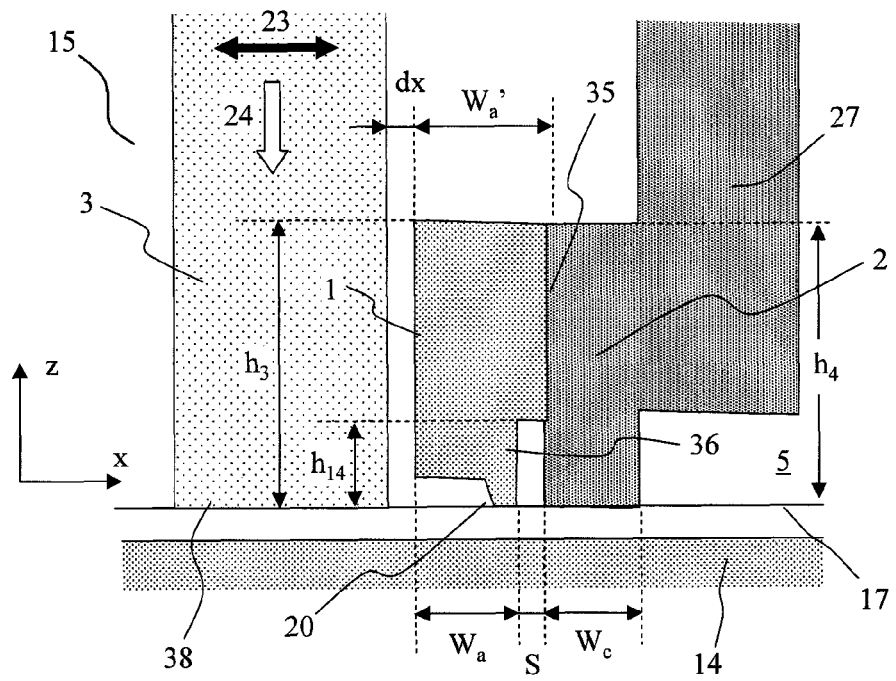
FIG. 25 is a diagram illustrating an example in which a width of the upper part of the optical near-field element in a direction parallel to a polarization direction has been widened so that the main pole and the optical near-field element come into contact with each other.

FIG. 25 illustrates an example in which the metallic structure 1 and the magnetic pole are brought into contact with each other in a case where the x-direction width of the metallic structure upper part is expanded so that the metallic structure 1 bulges toward the magnetic pole-side. The width $W_a$ at the metallic structure lower part 22 is set to 80 nm and the width $W_a'$ at the upper part 21 is set to 100 nm. The distance s from the lower part of the metallic structure 1 to the main pole 2 is set to 20 nm and the metallic structure 1 and the magnetic pole 2 are brought into contact with each other at the upper part. In the present example, the height $h_{14}$ of the portion 36 in contact with the dielectric body of the metallic structure lower part 22 is set to 150 nm. As shown, since the cubic volume of metallic parts with high conductivity increases and heat escapes to the side of the magnetic pole by expanding the x-direction width at the metallic structure upper part, a temperature rise of the optical near-field generating element can be suppressed.

Figure 26:
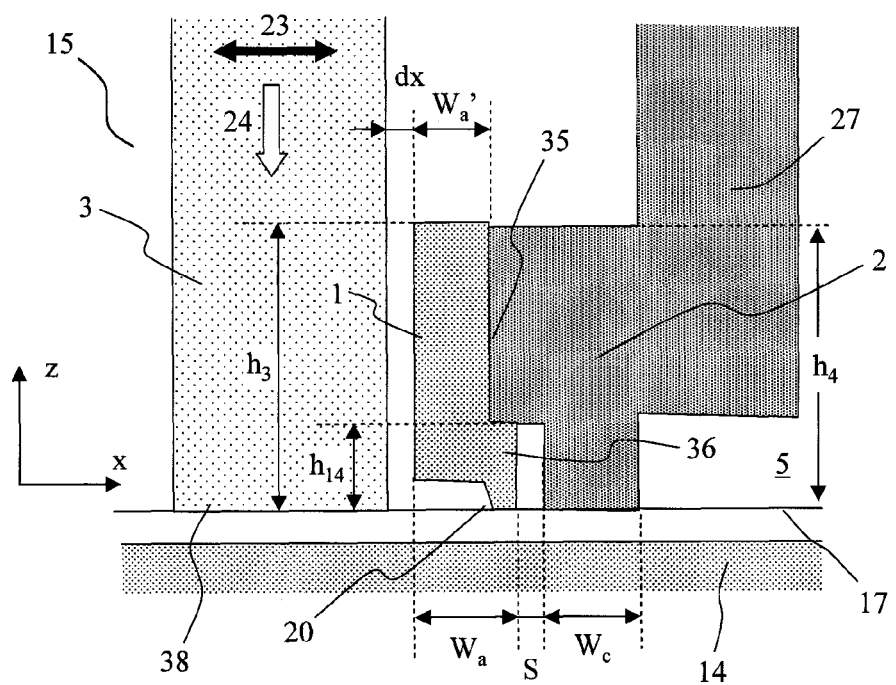
FIG. 26 is a diagram illustrating an example in which a width of the upper part of the optical near-field element in a direction parallel to a polarization direction has been reduced so that the main pole and the optical near-field element come into contact with each other.

FIG. 26 illustrates an example of a case where the x-direction width of the metallic structure upper part is set shorter than that of the lower part. The width $W_a$ at the metallic structure lower part 22 is set to 80 nm and the width $W_a$ at the upper part 21 is set to 50 nm. The distance s from the lower part of the metallic structure 1 to the main pole 2 is set to 20 nm and the metallic structure 1 and the magnetic pole are brought into contact with each other at the upper part. In the present example, the height $h_{14}$ of the portion 36 in contact with the dielectric body of the metallic structure lower part 22 is set to 150 nm. Since such an arrangement enables the main pole 2 to become fatter, a magnetic field intensity at a recording point can be increased.

Figure 27:
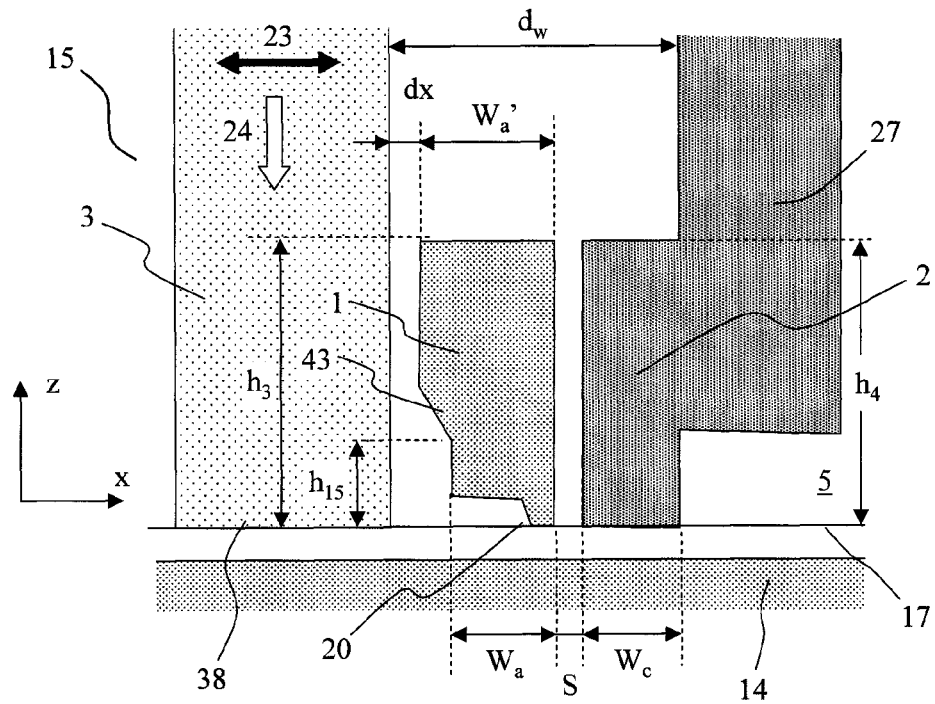
FIG. 27 is a diagram illustrating an example in which the upper part of the optical near-field element is adapted to protrude to the side of the waveguide.

FIG. 27 illustrates an example where the metallic structure upper part is bulged toward the side of the waveguide in a case where the x-direction width of the metallic structure upper part is set wider than that of the lower part. The width $W_a$ at the metallic structure lower part 22 is set to 80 nm and the width $W_a'$ at the upper part 21 is set to 140 nm. A distance $h_{15}$ from a portion where the x-direction width is expanded to the slider air-bearing surface is set to 200 nm. Since a distance $d_w$ from the waveguide core 3 to the magnetic pole 27 can be increased by bulging the metallic structure upper part toward the side of the waveguide, an evanescent light exuded to the waveguide clad 15 becomes less likely to strike the magnetic pole 27. As a result, propagation loss at the waveguide in a portion adjacent to the magnetic pole 27 can be reduced. Moreover, when the metallic structure 1 is bulged to the side of the waveguide as described above, an abrupt change in the width in a portion 43 where the x-direction width varies inhibits propagation of a surface plasmon and reduces light use efficiency. In order to prevent such an occurrence, as illustrated in FIG. 27, the width is favorably varied gradually in the portion 43 where the x-direction width varies.

Figure 28:
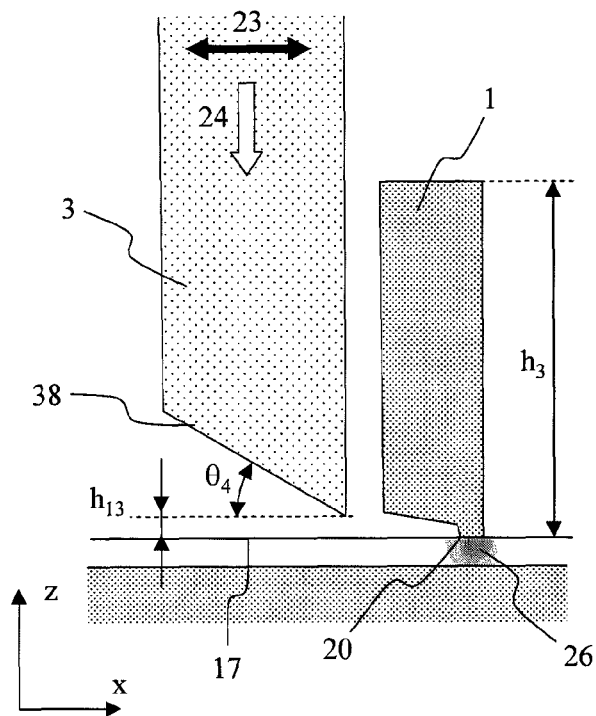
FIG. 28 is a diagram illustrating an example in which a termination of the waveguide is inclined.

FIG. 28 illustrates an example of a case where a core end 38 is inclined at a waveguide termination. When the core end 38 is not inclined, light is reflected at a boundary between the core 3 and air on the slider air-bearing surface and light ends up returning in a direction of a waveguide entrance. A part of the returned light is further reflected at the waveguide entrance and advances toward a waveguide exit. The returned lights interfere with each other inside the waveguide and causes a fluctuation of optical power inside the waveguide. In addition, a part of the light reflected at the boundary between the core 3 and air returns to the semiconductor laser. An output intensity of the semiconductor laser fluctuates due to the returned light. In contrast, when the termination 38 of the waveguide is inclined as illustrated in FIG. 28, reflected light at the termination 38 no longer returns to the waveguide entrance. Therefore, interference inside the waveguide 3 and returning light noise at the semiconductor laser become less likely to occur, and fluctuation of optical power is reduced.

Figure 29:
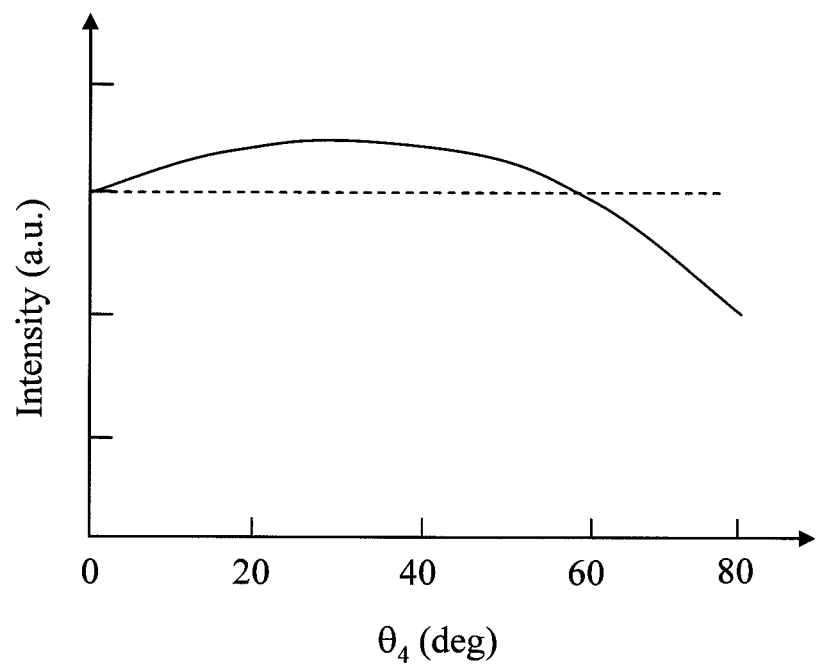
FIG. 29 is a diagram illustrating a relationship between an angle of the termination of the waveguide and optical near-field intensity.

When the termination 38 of the waveguide is inclined, optical near-field intensity can be increased by setting an angle $\theta_4$ of the termination 38 to an appropriate range. FIG. 29 illustrates a relationship between the angle $\theta_4$ of the termination 38 and optical near-field intensity. By setting the angle $\theta_4$ to 0 degrees to 60 degrees, inclusive, as illustrated in the drawing, optical near-field intensity can be increased in comparison to a case where the termination 38 is not inclined. In the present example, the angle $\theta_4$ of the termination 38 is set to 30 to 40 degrees, inclusive. Moreover, in order to excite a surface plasmon on the lateral face of the metallic structure 1, a distance $h_{13}$ between the tip of the waveguide core 3 and the slider air-bearing surface must be set sufficiently shorter than the height $h_3$ of the metallic structure 1. In the present example, the height $h_{13}$ is set to 0 to 100 nm.

Figure 30A:
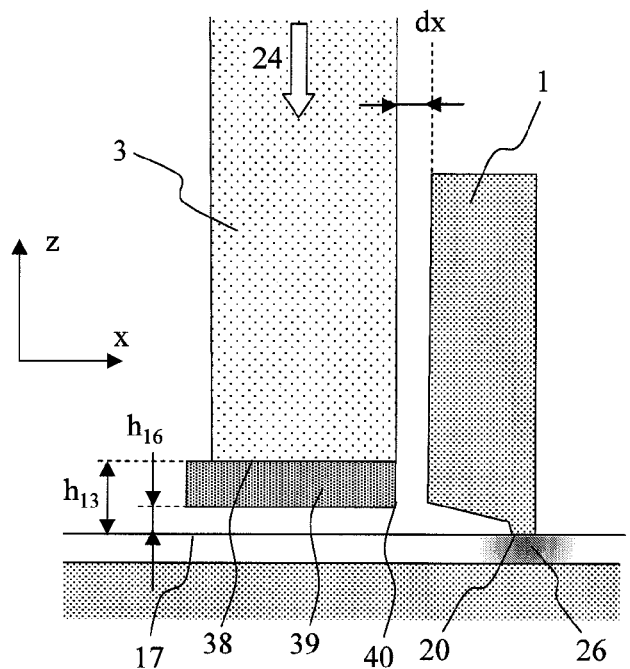
FIG. 30A is a diagram of an example in which a light blocking film is formed on a horizontal termination of the waveguide.

As illustrated in FIG. 30A, a light blocking film 39 may be formed on the waveguide termination 38. When the light blocking film 39 is not provided, outgoing light from the termination of the waveguide is irradiated on the medium as background light. As a result, a wide range of the medium is inadvertently heated, thereby creating a risk where data recorded on the heated portions may be erased. In contrast, by forming the light blocking film 39, the generation of background light can be suppressed. Moreover, while a distance $h_{16}$ from the slider air-bearing surface 17 to the light blocking film 39 may be set to 0, in this case, light is scattered at an edge 40 of the light blocking film and light intensity increases in a vicinity of the edge 40 (a localized light is generated in the vicinity of the edge 40). As a result, the medium is inadvertently heated in the vicinity of the edge 40. In order to prevent such an occurrence, the light blocking film 39 is favorably distanced from the slider air-bearing surface 17. In the present example, the distance $h_{13}$ from the waveguide end 38 and the slider air-bearing surface is set to 150 nm and the distance $h_{16}$ from the slider air-bearing surface 17 to the light blocking film 39 is set to 50 nm.

Figure 30B:
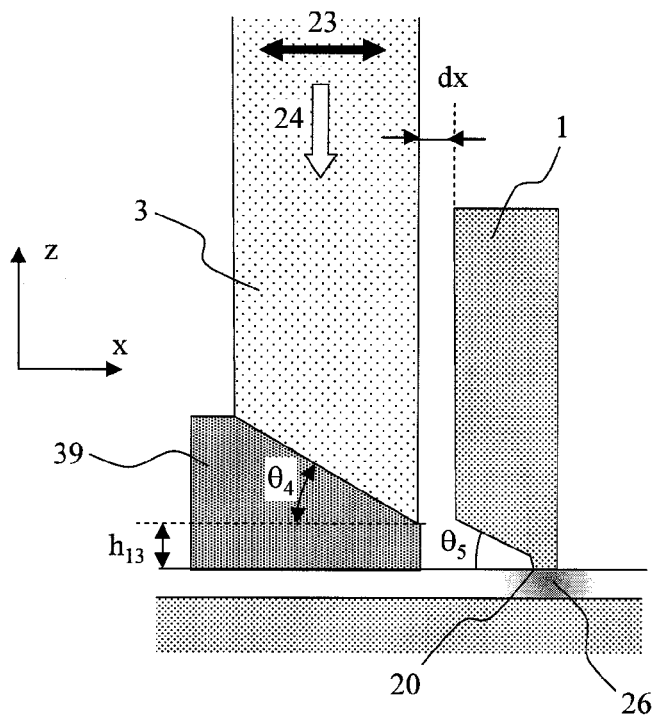
FIG. 30B is a diagram of an example in which a light blocking film is formed on an inclined termination of the waveguide.

Even when forming the light blocking film 39, the waveguide end 38 may be inclined as illustrated in FIG. 30B. In the present example, Cr is used as the material of the light blocking film, the angle $\theta_4$ of the termination 38 is set to 30 to 40 degrees, and the distance $h_{13}$ between the tip of the waveguide core 3 and the slider air-bearing surface is set to 100 nm. While the distance $h_{16}$ from the slider air-bearing surface 17 to the light blocking film 39 is set to 0 nm in the example illustrated in FIG. 30B, the light blocking film 39 may alternatively be adapted to be distanced from the slider air-bearing surface 17 (for example, $h_{16}$=50 nm) in the same manner as the example illustrated in FIG. 30A. Any material that reflects or absorbs light may be used as the light blocking film, and various metals such as gold, silver, and copper, alloys, carbons and the like may be used.

While the width of the waveguide core 3 is set such that the waveguide takes the form of a single mode waveguide (a waveguide that transmits only a single mode) in the present example, the width may alternatively be expanded to realize a multi-mode waveguide. In the case of multi-mode, an intensity distribution of light in the waveguide does not necessarily assume a distribution in which the center of the distribution has the greatest intensity. However, even in this case, a surface plasmon can be excited on a lateral face of the metallic structure 1, and by collecting surface plasmon at the metallic structure lower part 22, energy can ultimately be concentrated on a single point that is the vertex 20 where an optical near-field is generated. As shown, since the width of the waveguide core 3 can be expanded or, in other words, a mode field diameter can be increased by using a multi-mode waveguide core, coupling loss can be reduced when coupling light from a semiconductor laser to the waveguide. As a result, the intensity of the semiconductor laser can be lowered and power consumption can be reduced. In the present example, for example, a waveguide in which the core width $W_1$ in a direction perpendicular to the direction of the recording track is set to 900 nm and the core width $W_2$ in a direction parallel to the direction of the recording track is set to 200 nm or a waveguide where $W_1$=1000 nm and $W_2$=400 nm (wavelength: 780 nm) is used as the multi-mode waveguide.

Figure 31:
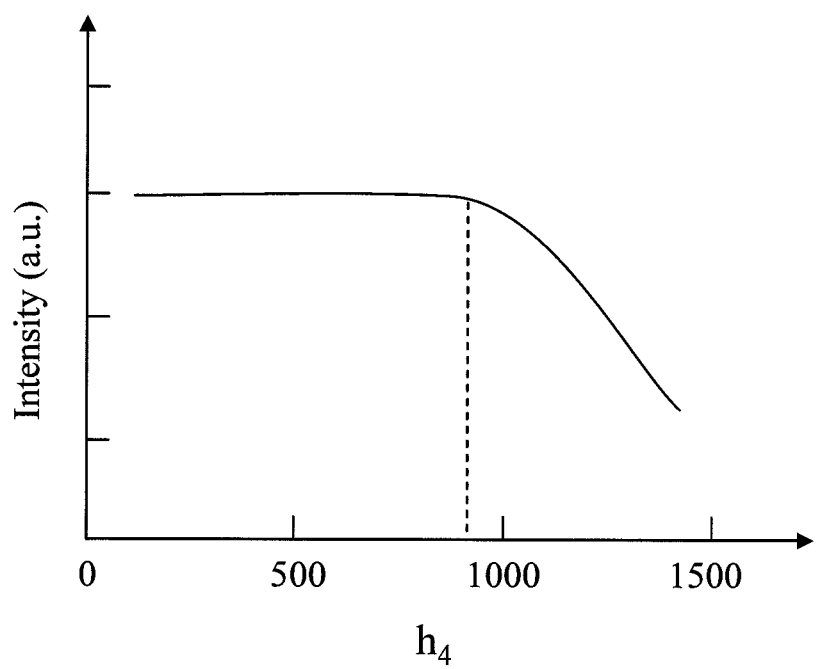
FIG. 31 is a diagram illustrating a relationship between a height of a main pole and optical near-field intensity when the height of the metallic structure is 900 nm.

An optimal condition of the relationship between the height $h_4$ of the main pole 2 and the height $h_3$ of the metallic structure 1 will now be described. FIG. 31 illustrates a relationship between the height $h_4$ of the main pole 2 and optical near-field intensity when the height $h_3$ of the metallic structure 1 is set to 900 nm. The drawing shows that optical near-field intensity decreases when the height $h_4$ of the main pole 2 becomes greater than the height $h_3$ of the metallic structure 1. When the height $h_4$ of the main pole 2 is greater than the height $h_3$ of the metallic structure 1, evanescent light exuded to the waveguide clad 15 strikes the main pole 2 and is scattered or absorbed. Consequently, light intensity in the waveguide conceivably drops before the light reaches the metallic structure 1 and optical near-field generating efficiency decreases. In order to prevent such an influence of the magnetic pole, the height $h_4$ of the main pole 2 is favorably set smaller than the height $h_3$ of the metallic structure 1 and, in the present example, is set to $h_3$=$h_4$=900 nm.

Figure 32A:
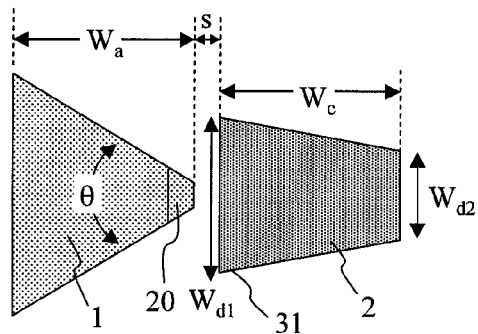
FIG. 32A is a diagram illustrating an example of a tip of a main pole having a trapezoidal cross-sectional shape.

While the main pole has a rectangular cross section as illustrated in FIG. 4 in the present example, the cross section may alternatively be trapezoidal as illustrated in FIG. 32A. In this manner, when the main pole has a trapezoidal cross-sectional shape, magnetic field intensity on a side close to a position heated by an optical near-field can be increased. Therefore, recording can be performed on a medium with greater coercive force and recording density can be improved. In the present example, a magnetic pole width $W_{d1}$ on the side near the vertex 20 where an optical near-field is generated is set to 150 nm and a magnetic pole width $W_{d2}$ on the opposite side is set to 100 nm.

Figure 32B:
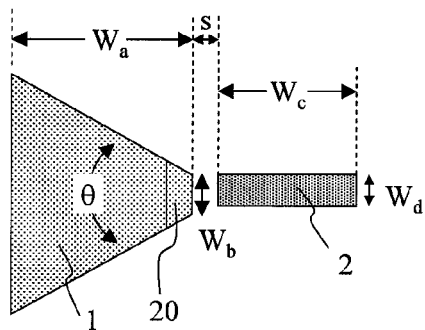
FIG. 32B is a diagram illustrating an example of a tip of a main pole whose magnetic pole width is equal to or smaller than a width of a tip of a scatterer.

In addition, when the cross sectional shape of the main pole is arranged to be rectangular or trapezoidal, as illustrated in FIG. 32B, the width $W_d$ of the main pole 2 may be set either substantially equal to or shorter than the width $W_b$ of the vertex of the scatterer 1. At a tip of the magnetic pole, a strong magnetic field is likely to be generated at an edge part 31 illustrated in FIG. 32A. Therefore, when $W_d$>$W_b$, a strong magnetic field is applied to an adjacent track, thereby creating a risk that data on the adjacent track may be erased. In contrast, when $W_d$<$W_b$ or $W_d$ $W_b$, the application of a magnetic field to an adjacent track can be suppressed. In the present example, $W_d$=$W_b$=20 nm.

Figure 32C:
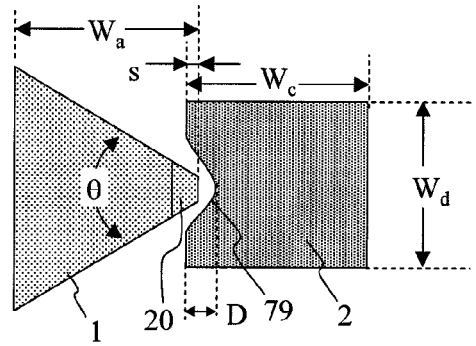
FIG. 32C is a diagram illustrating an example of a tip of a main pole in which a depression is formed near a vertex where an optical near-field is generated.

As illustrated in FIG. 32C, the main pole 2 may be depressed in a vicinity of the vertex 20 where an optical near-field is generated. By forming the main pole in this manner so that a part of the main pole is depressed and a part of the vertex 20 of the metallic structure 1 is placed inside the depression, a position heated by light can be brought closer to the center of the main pole. In this case, recording density can be improved due to the following reasons.

(i) Magnetic field intensity becomes greater the closer to the edge of the main pole. By depressing a part of the main pole 2, a position heated by light can be brought closer to the main pole and, consequently, the magnetic field intensity at the heated position can be increased. As a result, recording can now be performed on a medium with greater coercive force (or anisotropy field) and recording density can be improved.

Figure 33:
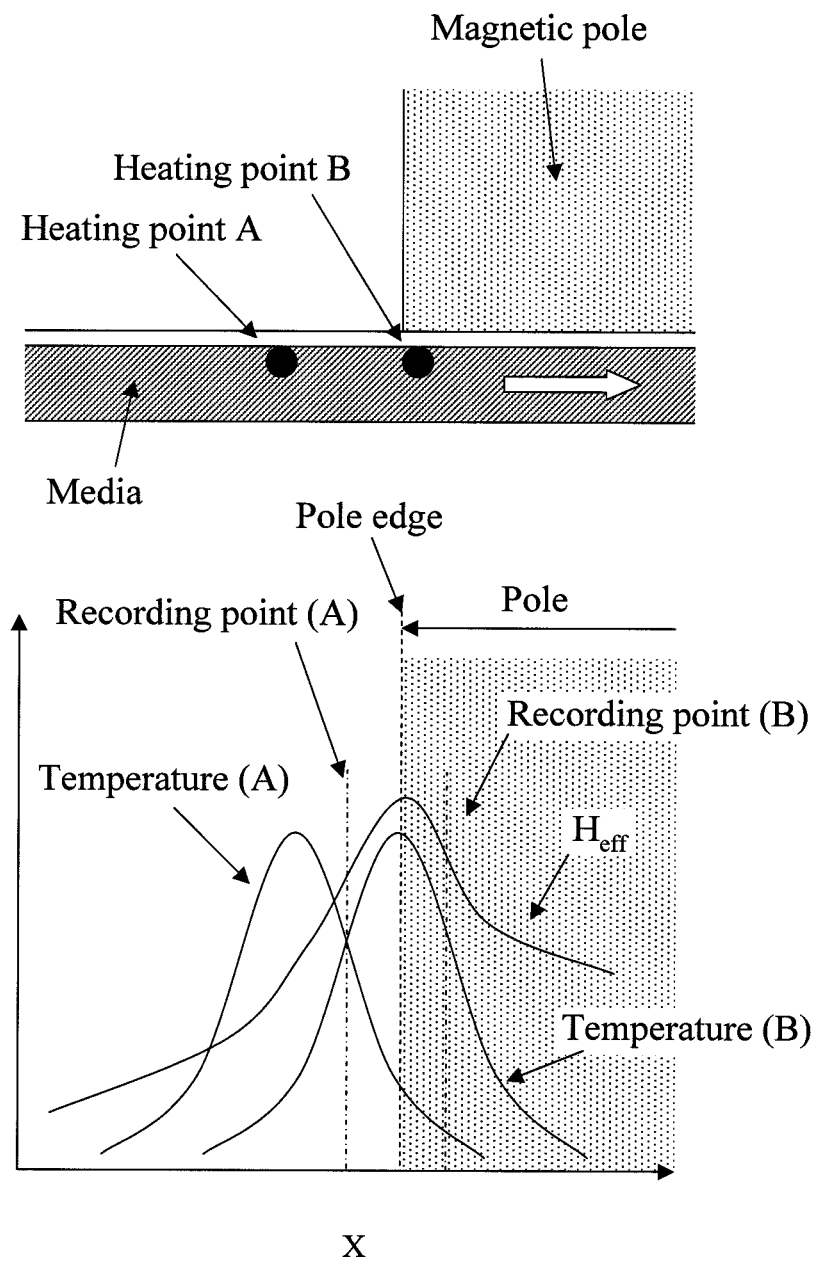
FIG. 33 is a diagram illustrating a relationship between a distance from the main pole and magnetic field intensity.

(ii) In thermally assisted magnetic recording, a boundary (recording point) of a recorded bit is determined by a position where a temperature gradient dT/dx is minimum, where T denotes temperature. In this case, at the recording point, the smaller a gradient $dH_{eff}/dx$ of an effective magnetic field intensity $H_{eff}$, the more clearer the boundary of recorded bits, thereby enabling a high recording density to be realized. As illustrated in FIG. 33, the effective magnetic field intensity $H_{eff}$ becomes stronger at edge parts of the main pole. When the heated position is on the outside of the main pole (heated position A), the magnetic field gradient at the recording point takes a positive value. However, when the heated position approaches the center of the main pole (heated position B), the magnetic field gradient at the recording point takes a negative value and a position where $dT/dx$ is minimum and a position where $dH_{eff}/dx$ is minimum can be superimposed. Therefore, the boundary between recorded bits becomes more clearer and a high recording density can be achieved.

In the present example, the widths of the tip of the main pole are set such that $W_c=150$ nm and $W_d=120$ nm, and a depressed amount D of the depressed portion 79 is set to 30 nm. A distance s from the vertex where an optical near-field is generated to the edge of the main pole is set to −10 nm (a positive sign is assigned to s when the vertex where an optical near-field is generated is on the outside of the main pole). In addition, in order to increase magnetic field intensity at a recording point, as illustrated in FIG. 32A, the main pole tip may be adapted to have a trapezoidal cross-sectional shape and may be set such that $W_c=150$ nm, $W_{d1}=120$ nm, and $W_{d2}=100$ nm.

While the vertex where an optical near-field is generated is placed inside a depression 79 of the main pole (s is set to a negative value) in the above example, the vertex where an optical near-field is generated need not necessarily be placed inside the depression 79 and may instead be set such that, for example, s=0 or 5 nm. In other words, the vertex where an optical near-field is generated may be placed in the vicinity of the depression 79 of the main pole. Even in this case, the magnetic field intensity at a position heated by the optical near-field can be increased in comparison to a case where the depression is not formed.

Figure 32D:
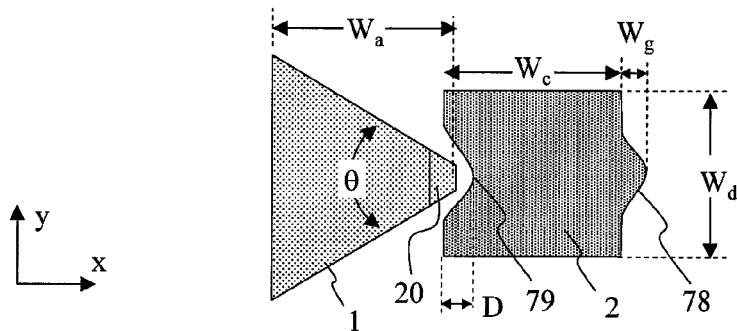
FIG. 32D is a diagram illustrating an example of a tip of a main pole in which a depression is formed near a vertex where an optical near-field is generated and a protrusion is formed on a side opposite to the optical near-field generating element.

When forming a depression on the main pole 2, as illustrated in FIG. 32D, a protrusion 78 may be formed on a side opposite to the optical near-field generating element. Since such an arrangement enables the cross section of the main pole to be increased, a magnetic field intensity can be increased. In the present example, a protruding amount ($W_g$) of the protrusion 78 is set equal to the depressed amount D to 30 nm.

Figure 34:
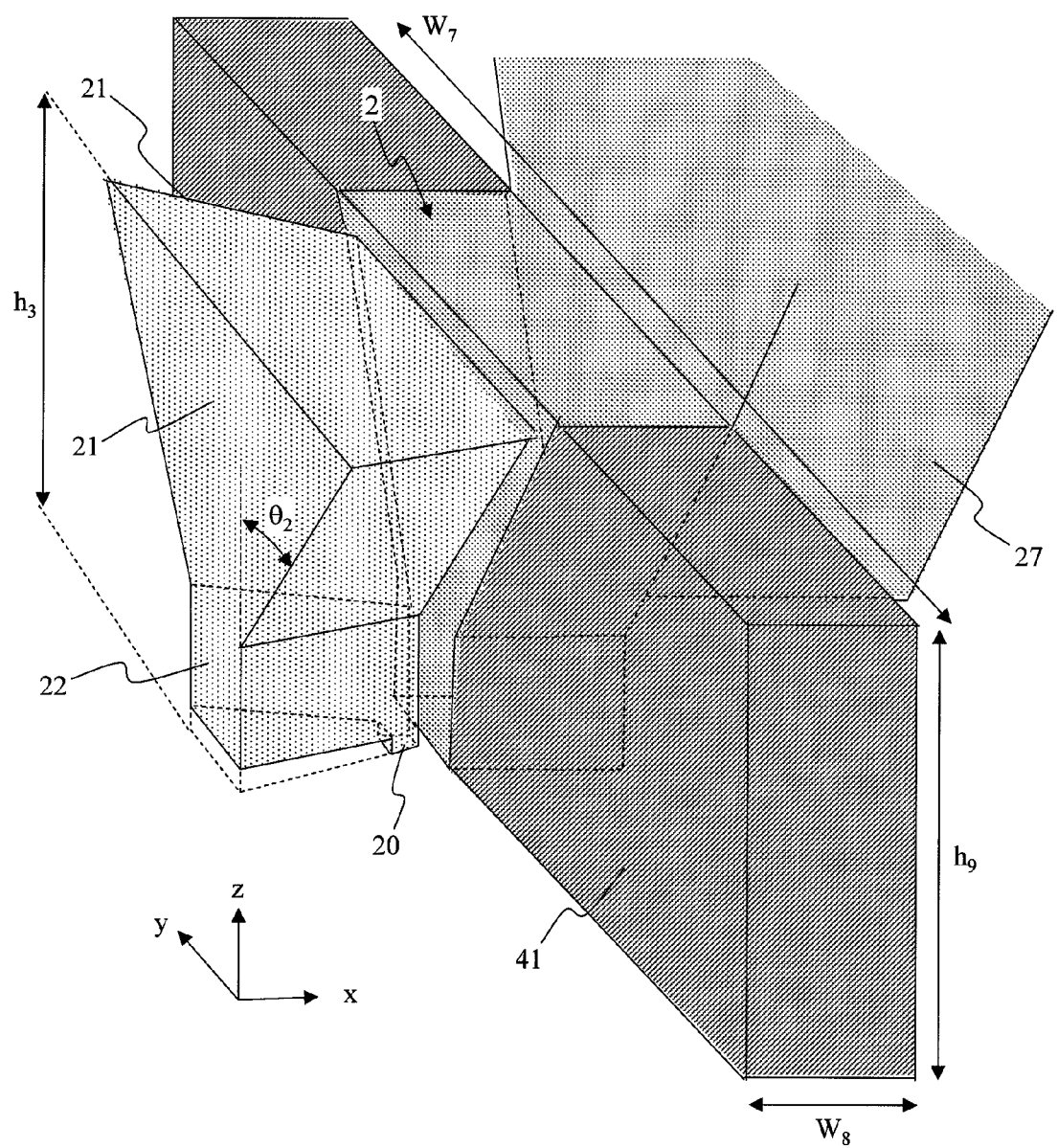
FIG. 34 is a diagram illustrating an example in which a conductive material is used beside the main pole.

While alumina is used as the material of a periphery of the main pole in the example described above, a nonmagnetic conductive material may alternatively be used for the periphery of the main pole. In an example illustrated in FIG. 34, a metallic layer 41 is formed beside the main pole 2. Cr is used as the material of the metallic layer, a width ($W_8$) of the metallic layer 41 in the x direction is set to 150 nm so as to equal the width of the main pole, and a width ($W_7$) of the metallic layer 41 in the y direction is set to 5 μm. A plane of the main pole 2 on a side of the optical near-field element and a plane of the metallic layer 41 beside the main pole on a side of the optical near-field element are adapted to be on the same plane. By using metal as the material to the side of the main pole in this manner, heat generated at the optical near-field element is readily guided to the side of the main pole and a temperature rise of the element can be suppressed. While Cr is used as a material of a the conductive layer 41 beside the main pole in the present example, other metals may also be used and the material may be gold, silver, copper, aluminum, titanium, tungsten, platinum, iridium, tantalum, silicon, and the like. In addition, the material of the conductive layer 41 beside the main pole may be a nonmetallic member with a high thermal conductivity such as SiC. In the present example, while the width ($W_8$) in the x direction of the conductive layer 41 beside the main pole is set so as to equal the width of the main pole, a different width may be adopted such as 500 nm. While a height $h_9$ of the conductive layer 41 beside the main pole is arbitrary, in consideration of light use efficiency, the height $h_9$ of the conductive layer 41 beside the main pole is favorably set equal to or lower than the height $h_3$ of the conductive structure that generates an optical near-field in the same manner as the relationship between the height $h_3$ of the optical near-field generating element and the height of the main pole illustrated in FIG. 31. In the present example, the height $h_3$ of the conductive structure that generates an optical near-field is set to 900 nm and the height $h_9$ of the conductive layer 41 beside the main pole is also set to 900 nm.

Figure 23:
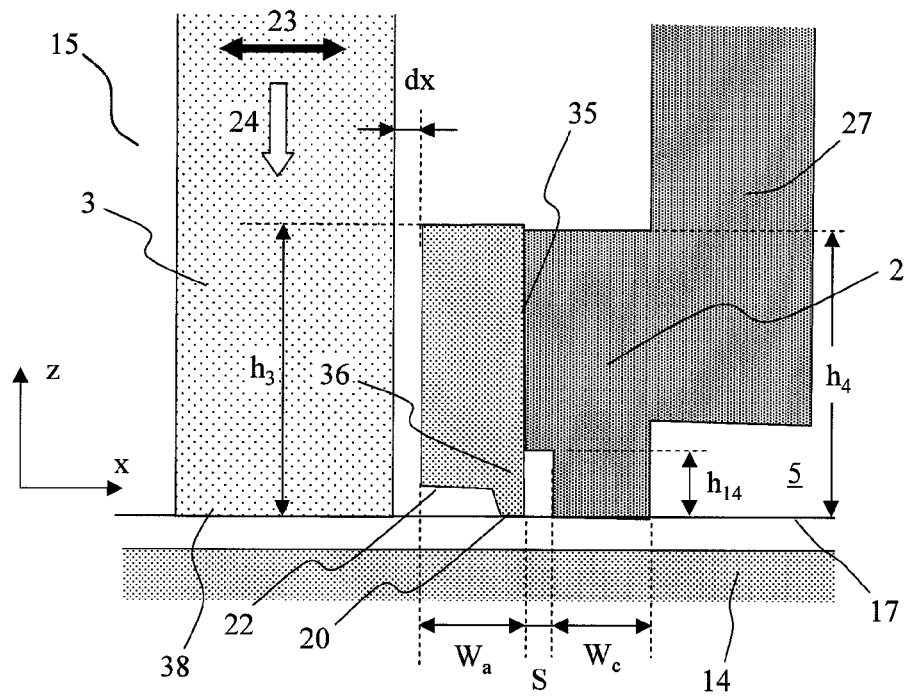
FIG. 23 is a diagram illustrating an example in which an upper part of a main pole is adapted to protrude toward a side of an optical near-field element so that the main pole and the optical near-field element come into contact with each other.
Figure 42:
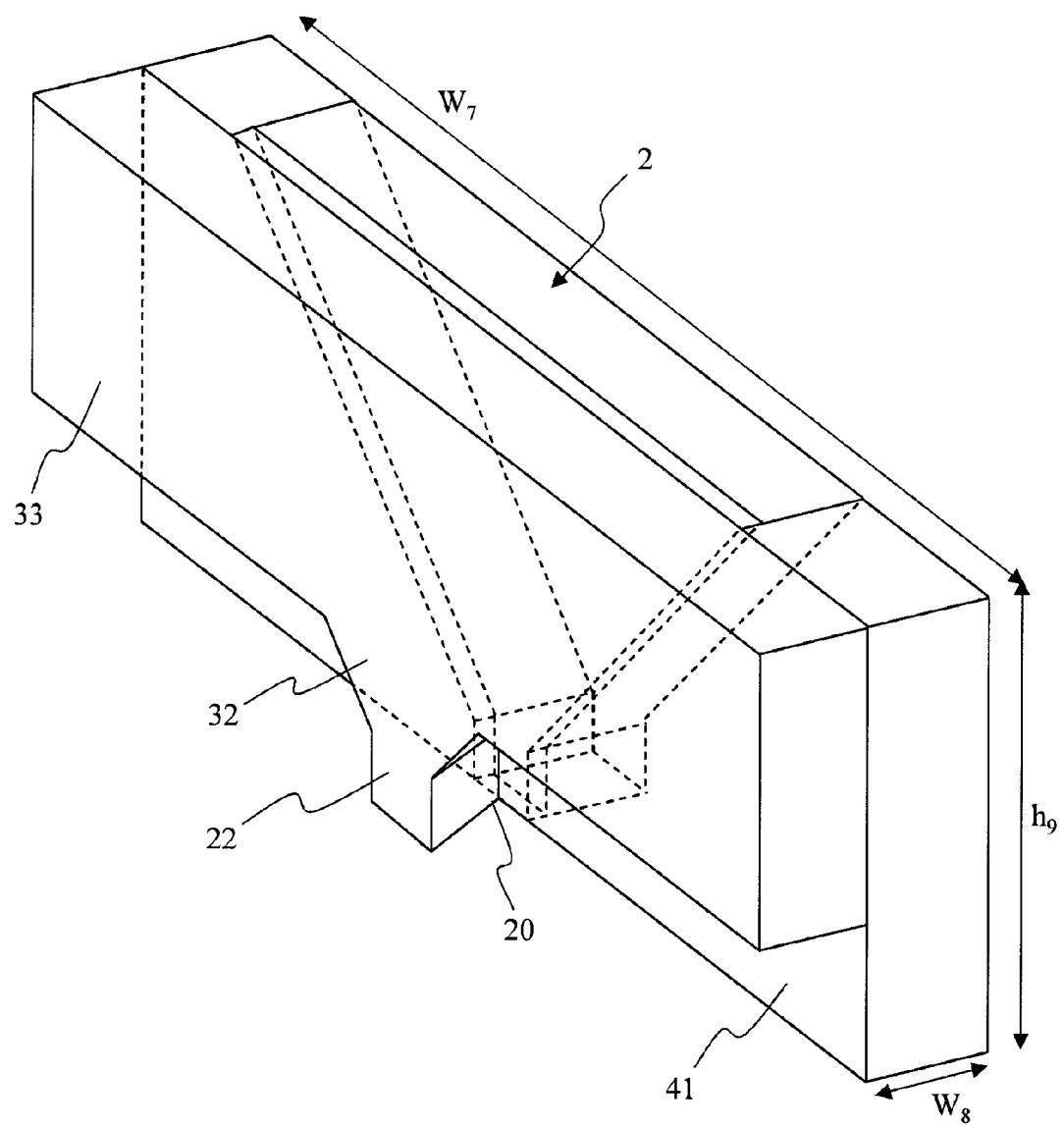
FIG. 42 is a diagram illustrating another example in which a conductive material is used beside the main pole.

When a conductive material is to be used in a periphery of the main pole described above, as illustrated in FIG. 42, the conductive structure that generates an optical near-field and the conductive layer 41 beside the main pole may be brought into contact with each other. In the present example, the optical near-field generating element and the conductive layer 41 beside the main pole are brought into contact with each other by arranging the shape of the conductive structure that generates an optical near-field to become wider at an upper part and by arranging the widened portion 33 of the optical near-field generating element and the conductive layer 41 beside the main pole so as to protrude toward a side of the optical near-field element with respect to the main pole 2. In such an arrangement, since heat generated at the optical near-field generating element is directly transmitted to the conductive layer 41 beside the main pole, heat radiating performance is improved and a temperature rise of the optical near-field generating element can be significantly suppressed. Moreover, even when the conductive layer 41 beside the main pole and the optical near-field generating element are brought into contact with each other, as illustrated in FIG. 23, an upper part of the conductive structure that generates an optical near-field and the magnetic pole may be brought into contact with each other. Such an arrangement enables heat radiating performance to be further improved.

Figure 8:
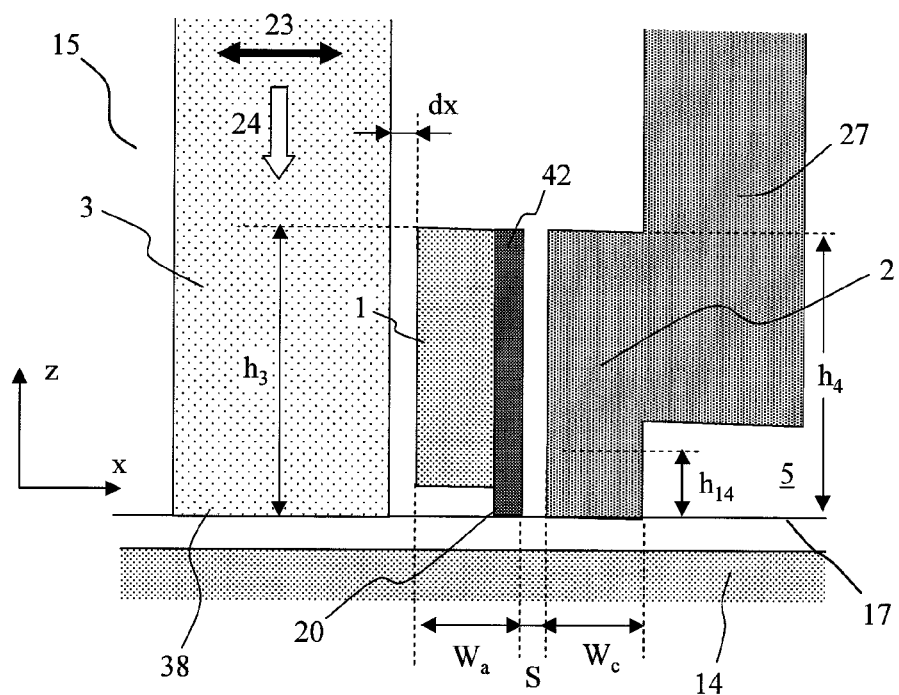
FIG. 8 is a diagram illustrating an example of a metallic structure in which a material of a vertex where an optical near-field is generated has been altered from materials of other parts.
Figure 35A:
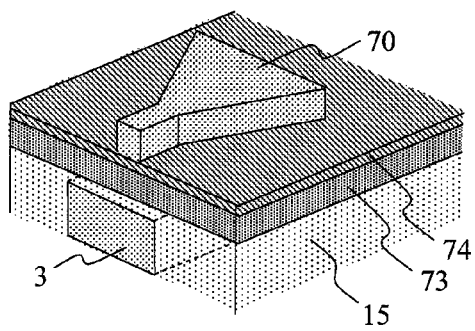
FIGS. 35A to 35D are diagrams illustrating a method of fabricating a structure according to the present invention.
Figure 35B:
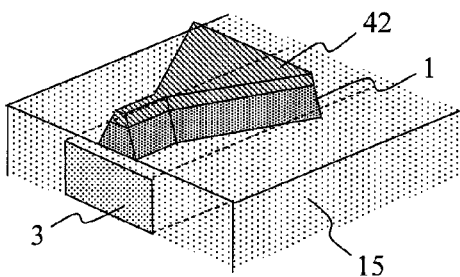

FIGS. 35A to 35D are diagrams illustrating a method of fabricating the structure according to the present invention and, more particularly, a method of fabricating the structure illustrated in FIGS. 4, 32A, and 32B. Here, a case such as illustrated in FIG. 8 will be described, in which the layer 42 whose material differs from other parts is formed on a portion of the vertex 20 where an optical near-field is generated. First, as illustrated in FIG. 35A, after forming the clad 15 and the core 3 of the waveguide, a metallic layer 73 for forming a main portion of the metallic structure 1 and a metallic layer 74 for forming the layer 42 whose material differs from other parts are formed on the clad 15 and the core 3 of the waveguide, and a resist pattern 70 is formed on the metallic layers 73 and 74 by lithography. Next, as illustrated in FIG. 35B, using the resist pattern 70 as a mask, the metallic layers 73 and 74 are etched using a dry etching device to form the metallic structure 1. At this point, instead of performing etching using the resist pattern 70 as a mask, etching may be performed using a hard mask such as a metal mask.

Figure 35C:
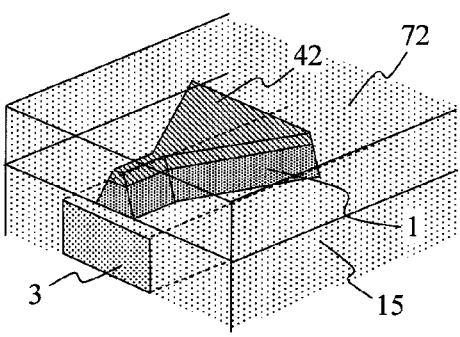
Figure 35D:
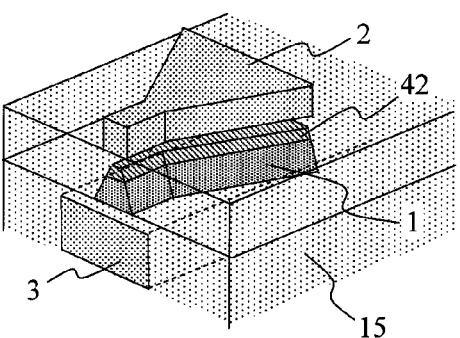
Figure 36A:
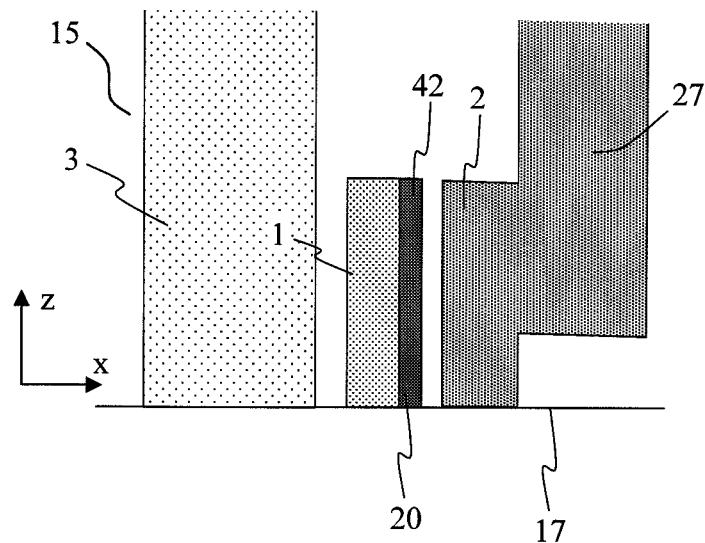
FIGS. 36A and 36B are diagrams illustrating a method of fabricating a recessed part.
Figure 36B:
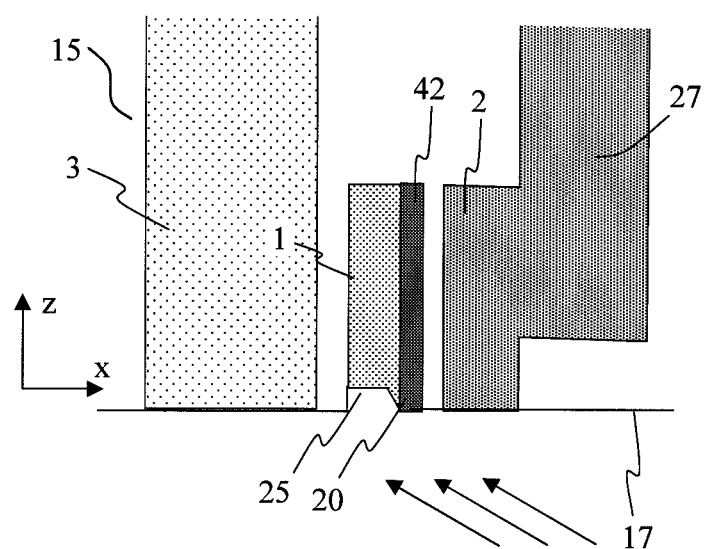

Next, as illustrated in FIG. 35C, a dielectric layer 72 is formed on the metallic structure 1 and a surface of the dielectric layer 72 is smoothed by polishing. Next, as illustrated in FIG. 32D, after forming a film of magnetic material to become a magnetic pole, the magnetic material is patterned by lithography to form the main pole 2. In order to form the recessed part 25, after forming the air-bearing surface 17 as illustrated in FIG. 36A, the air-bearing surface is etched using a dry etching device as illustrated in FIG. 36B. In doing so, portions other than the vertex 20 are adapted to be etched by using a material with a low etch rate when performing dry etching as the material of the layer 42 whose material differs from other parts.

Figure 37A:
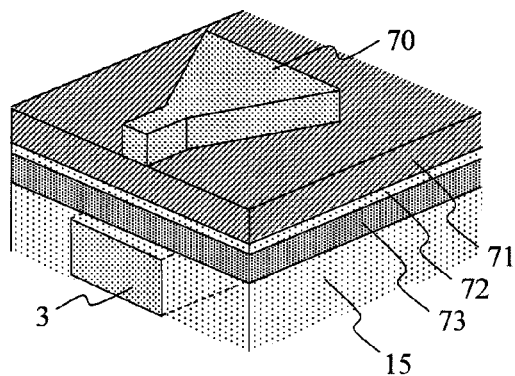
FIGS. 37A to 37D are diagrams illustrating a method of fabricating a structure according to the present invention.
Figure 37B:
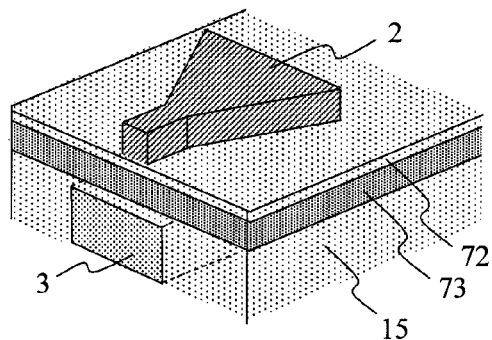
Figure 37C:
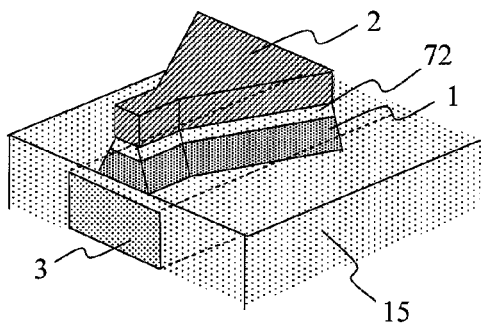
Figure 37D:
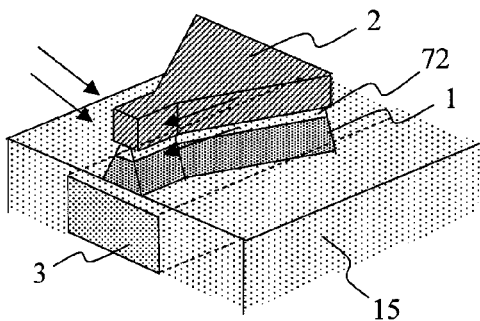

The main pole 2 may alternatively be formed first as illustrated in FIGS. 37A to 37D by arranging the main pole 2 and the metallic structure 1 to have the same shape. First, as illustrated in FIG. 37A, after forming the clad 15 and the core 3 of the waveguide, the metallic layer 73 to become the metallic structure 1, the dielectric layer 72, and a layer 71 of magnetic pole material are formed on the clad 15 and the core 3 of the waveguide, and the resist pattern 70 is formed on the metallic layer 73, the dielectric layer 72, and the layer 71 by lithography. Next, as illustrated in FIG. 37B, using the resist pattern 70 as a mask, the layer 71 of magnetic pole material is etched using a dry etching device such as ion milling or a reactive ion etching device to form the main pole 2. At this point, instead of performing etching using the resist pattern 70 as a mask, etching may be performed using a hard mask such as a metal mask. Next, as illustrated in FIG. 37C, using the main pole 2 or the mask pattern (resist or hard mask) formed in order to etch the main pole 2 as a mask, the metallic layer 73 and the dielectric layer 72 are etched using a dry etching device to form the metallic structure 1. At this point, etching conditions are adjusted so that a tip of the metallic structure 1 acquires a triangular cross-sectional shape. When the width $W_b$ of the vertex 20 where an optical near-field is generated is set to be shorter than the width $W_d$ of the main pole as illustrated in FIGS. 4 and 32A, subsequently, as illustrated in FIG. 37D, a portion of the metallic structure 1 is etched from a lateral direction to reduce the width $W_b$ of the vertex 20 where an optical near-field is generated. In the method described above, the position of the main pole 2 and the position of the metallic structure 1 automatically become the same. Therefore, an influence of displacement between the main pole 2 and the metallic structure 1 can be eliminated.

Figure 38A:
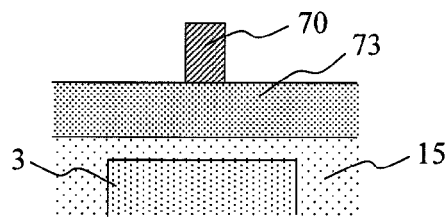
FIGS. 38A to 38H are diagrams illustrating a method of fabricating a structure in which a depression is provided on a main pole.
Figure 38B:
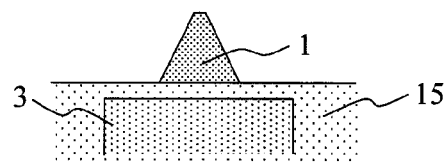
Figure 38C:
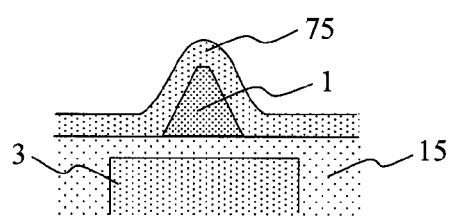
Figure 38D:
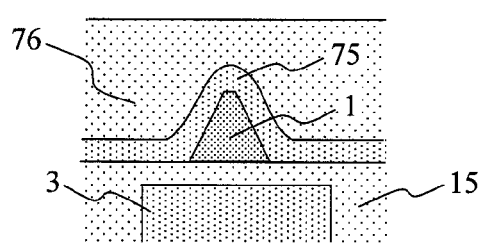

FIGS. 38A to 38H illustrate a fabrication method of a structure in which a depression is formed on the main pole 2 in the vicinity of the vertex 20 where an optical near-field is generated as illustrated in FIG. 32C. First, as illustrated in FIG. 38A, after forming the clad 15 and the core 3 of the waveguide, the metallic layer 73 to become the metallic structure 1 is formed on the clad 15 and the core 3 of the waveguide, and the resist pattern 70 is formed on the metallic layer 73 by lithography. Next, as illustrated in FIG. 38B, using the resist pattern 70 as a mask, the metallic layer 73 is etched using a dry etching device to form the metallic structure 1. At this point, instead of performing etching using the resist pattern 70 as a mask, etching may be performed using a hard mask such as a metal mask. Next, as illustrated in FIG. 38C, a first dielectric layer 75 is formed on the metallic structure 1 and, further, a second dielectric layer 76 is formed on the first dielectric layer 75 as illustrated in FIG. 38D. A thickness of the first dielectric layer 75 is set so as to equal a distance (D in FIG. 32C) between the vertex 20 where an optical near-field is generated and the magnetic pole.

Figure 38E:
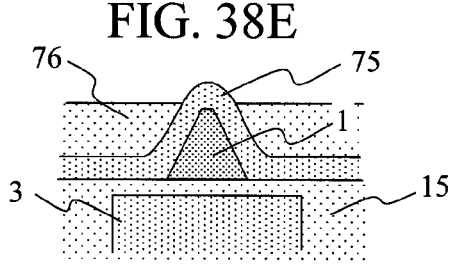
Figure 38F:
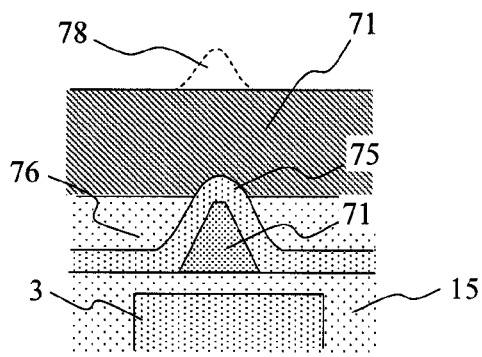
Figure 38G:
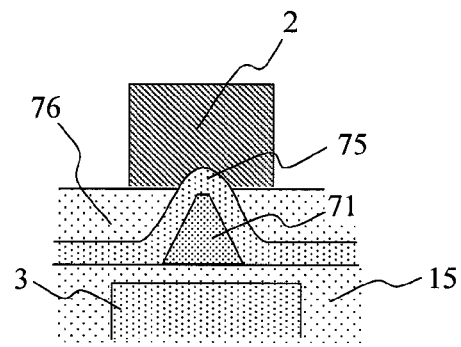
Figure 38H:
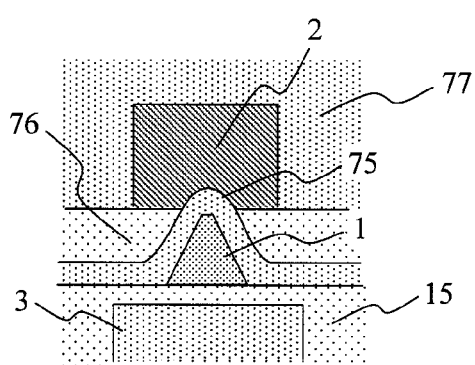

Next, as illustrated in FIG. 38E, a surface of the second dielectric layer 76 is smoothed by polishing, and the second dielectric layer 76 is etched using a reactive ion etching device. At this point, a material more resistant to be etched during reactive ion etching is used as the first dielectric layer 75. Etching is stopped when the first dielectric layer 75 slightly breaks through at the vertex 20 where an optical near-field is generated. Next, as illustrated in FIG. 38F, a film of the magnetic material 71 to become the main pole is formed on the first and second dielectric layers 75 and 76. At this point, while the protrusion 78 is formed on an upper part of the main pole, the protrusion may be kept as-is or removed through smoothing by polishing or the like. Next, as illustrated in FIG. 38G, the main pole 2 is formed by lithography, and finally, as illustrated in FIG. 38H, a layer 77 of a dielectric or a nonmagnetic conductive material is formed in the periphery of the main pole. According to the fabrication method described above, a depression can be formed without positioning at the position of the vertex 20 where an optical near-field is generated.

Figure 39:
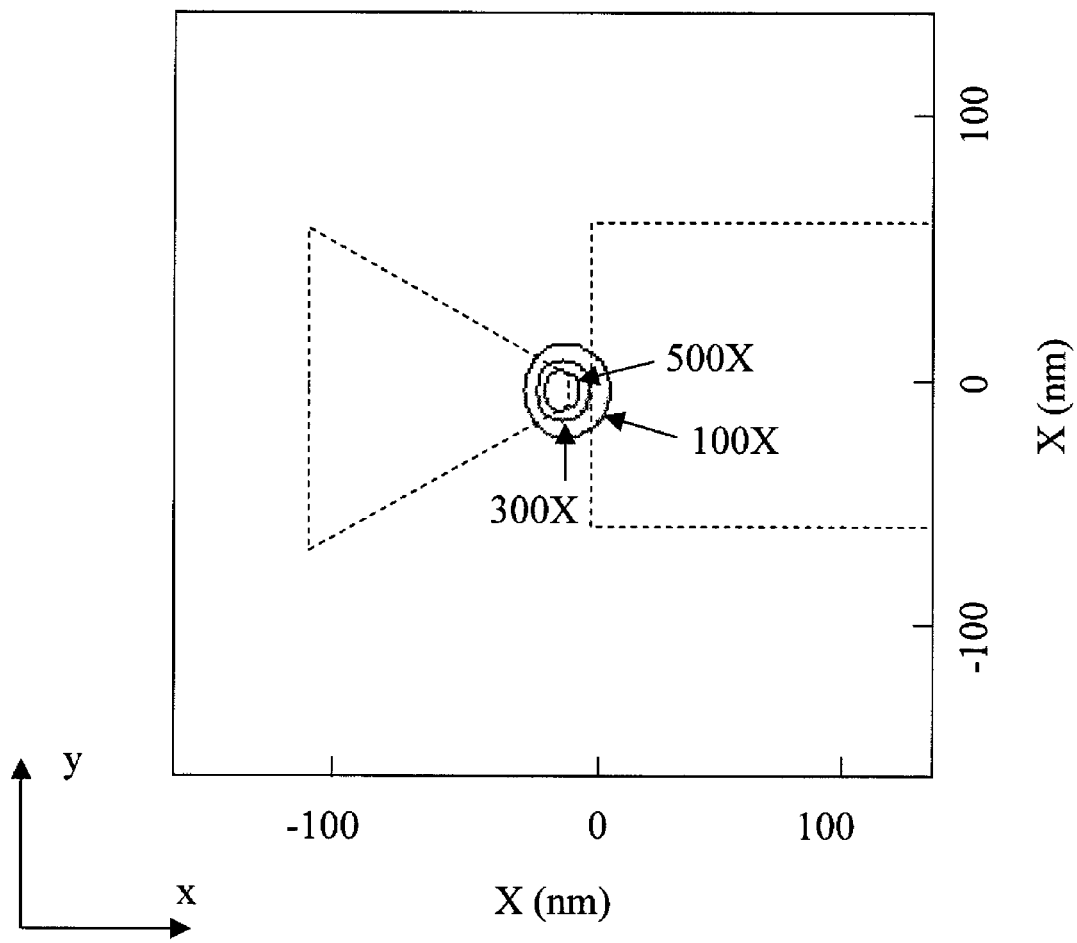
FIG. 39 is a diagram illustrating an intensity distribution of an optical near-field generated on a medium surface by an optical near-field generator according to the present invention.

FIG. 39 illustrates an optical near-field intensity distribution on a recording medium surface when an optical near-field is generated using the optimal structure of the example described above. In this case, a wavelength of incident light is set to 780 nm. Values of optical near-field intensity represent an intensity ratio when the intensity of incident light is assumed to be 1. As illustrated in the drawing, a strong optical near-field with an intensity of approximately 500 times the incident light intensity is generated in the vicinity of the vertex 20 of the scatterer.

FIG. 40A illustrates an overall view of a recording device using a recording head according to the present invention. The floating slider 5 is fixed to a suspension 13 and is positioned to a desired track position on the magnetic disk 14 by an actuator constituted by a voice coil motor 49. A air bearing surface is formed on the head surface and floated above the magnetic disk 14 at a floating amount of 5 nm or less. The magnetic disk 14 is fixed to be rotated to a spindle 53 that is rotationally driven by a motor. As illustrated in FIG. 40B, a semiconductor laser 55 is mounted in a vicinity of a wiring terminal 51 at an end of a tail part 56 of a suspension. Light generated at the semiconductor laser 55 is introduced to the slider 5 via the polymer waveguide 10 integrated on the suspension. The end of the tail part of the suspension mounted with the semiconductor laser is arranged in a vicinity of a circuit board 52 arranged beside a base (e-block) of an arm. A driving IC for the semiconductor laser 55 is arranged on the circuit board 52. While the semiconductor laser is mounted on the end of the tail part of the suspension in the present example, the semiconductor laser may instead be arranged directly on the e-block or arranged on the driver circuit board 52. A recording signal is generated by a signal-processing LSI 54. The recording signal and power for the semiconductor laser are supplied to the semiconductor laser driver through an FPC (flexible print circuit) 50. At the moment of recording, a magnetic field is generated by a coil provided in the floating slider 5 and, at the same time, light is emitted by the semiconductor laser to form a recording mark. Data recorded on the recording medium 14 is reproduced by a magnetic reproducing element (a GMR element or a TMR element) formed in the floating slider 5. Signal processing is performed on the reproducing signal by the signal processing circuit 54.

Figure 41:
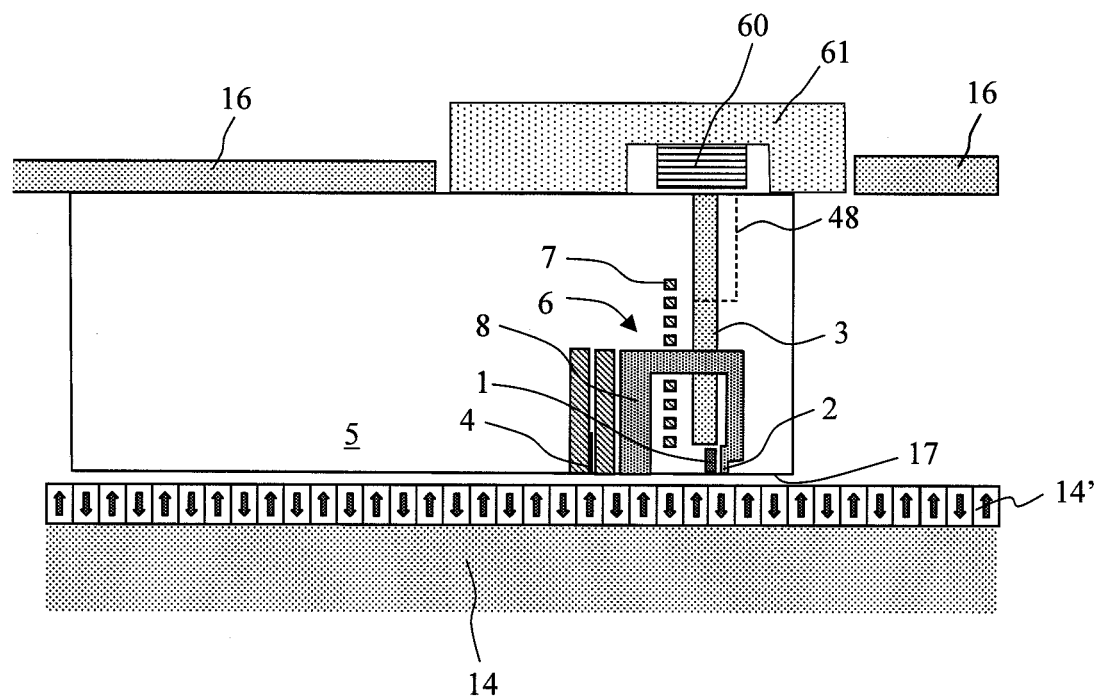
FIG. 41 is a diagram illustrating an example in which a semiconductor laser is mounted on an upper part of a slider.

While the semiconductor laser is arranged outside of the slider and guided to the slider using an optical waveguide in the present example, as illustrated in FIG. 41, the semiconductor laser may alternatively be arranged directly on the slider. In the present example, a submount 61 mounted with a surface-emitting laser 60 is arranged on an upper face of the slider 5. A hole is opened at the flexure part 16 of the suspension and the submount mounted with the surface-emitting laser is arranged inside the hole. While a surface-emitting laser is used as a laser in the present example, an edge-emitting semiconductor laser may alternatively be used.

What is claimed is:

1. A thermally assisted magnetic recording head comprising a magnetic field generating unit that generates a recording magnetic field and an optical near-field generating unit that generates an optical near-field, wherein the optical near-field generating unit includes a conductive structure and a waveguide that guides incident light from a light source, and the structure has a shape in which a width of an end face of a air-bearing surface-side in a direction perpendicular to a polarization direction of incident light transmitted through the waveguide gradually becomes smaller toward a vertex where an optical near-field is generated, and the waveguide is formed beside the structure, wherein a width of the structure in a direction perpendicular to the polarization direction of incident light is narrower on a air-bearing surface-side than on a side opposite thereto;

wherein a face where a plasmon is excited is opposite to the vertex in the structure.

2. The thermally assisted magnetic recording head according to claim 1, wherein the polarization direction of the incident light is substantially perpendicular to an interface where a core or a clad of the waveguide and the structure come into contact with each other.

3. The thermally assisted magnetic recording head according to claim 1, wherein the structure has a tapered part whose width in a direction perpendicular to the polarization direction of incident light gradually becomes smaller in a traveling direction of the incident light.

4. The thermally assisted magnetic recording head according to claim 3, wherein the tapered part has a lateral-side spread angle of 15 to 60 degrees, inclusive.

5. The thermally assisted magnetic recording head according to claim 1, wherein a distance between the structure and the waveguide core is 100 nm or less.

6. The thermally assisted magnetic recording head according to claim 1, wherein if λ (nm) denotes a wavelength of the incident light and n denotes a refractive index of a material that comes into contact with the lateral face of the structure, then a height of the structure may be expressed as $$\left(\frac{\lambda}{2}+10\right)\times(-0.778n+2.268) \text{ to } (\lambda+720)\times(-0.778n+2.268),$$

inclusive.

7. The thermally assisted magnetic recording head according to claim 1, wherein a width of the structure in a direction perpendicular to the polarization direction of incident light is varied in multiple stages in the traveling direction of the incident light.

8. The thermally assisted magnetic recording head according to claim 1, wherein a maximum width of the structure in a direction perpendicular to the polarization direction of incident light is greater than a width of the waveguide.

9. The thermally assisted magnetic recording head according to claim 1, wherein the structure has a widened portion on an incidence side of the incident light and an end face approximately parallel to the air-bearing surface on a side of the air-bearing surface, and if λ (nm) denotes a wavelength of the incident light and n denotes a refractive index of a material of a periphery of the structure, then a distance from the approximately parallel end face to the vertex where an optical near-field is generated may be expressed as $$\left(\frac{\lambda}{10}+102\right)\times(-0.778n+2.268) \text{ to } \left(\frac{\lambda}{2}-40\right)\times(-0.778n+2.268),$$

inclusive.

10. The thermally assisted magnetic recording head according to claim 1, wherein a termination of the waveguide is inclined.

11. The thermally assisted magnetic recording head according to claim 1, wherein a width of the structure in a direction parallel to the polarization direction of incident light is partially varied in the traveling direction of the incident light.

12. The thermally assisted magnetic recording head according to claim 1, wherein the magnetic field generating unit includes a main pole that generates the recording magnetic field, and the structure is arranged in a vicinity of the main pole.

13. The thermally assisted magnetic recording head according to claim 12, wherein a part of the lateral face of the structure is in contact with the main pole.

14. The thermally assisted magnetic recording head according to claim 12, wherein a depression is formed at a part of the main pole and the vertex of the structure is positioned in a vicinity of the depression.

15. The thermally assisted magnetic recording head according to claim 12, wherein a layer of conductive material is formed in a periphery of the main pole and a part of the lateral face of the structure is in contact with the layer of conductive material.

16. A thermally assisted magnetic recording device comprising a magnetic recording medium, a medium driving unit that drives the magnetic recording medium, a thermally assisted magnetic recording head including a magnetic field generating unit that generates a recording magnetic field and an optical near-field generating unit that generates an optical near-field, and an actuator for positioning the thermally assisted magnetic recording head at a desired track position on the magnetic recording medium, wherein the optical near-field generating unit includes a conductive structure and a waveguide that guides incident light from a light source, and the structure has a shape in which a width of an end face of a air-bearing surface-side in a direction perpendicular to a polarization direction of incident light transmitted through the waveguide gradually becomes smaller toward a vertex where an optical near-field is generated, and the waveguide is formed beside the structure, wherein a width of the structure in a direction perpendicular to the polarization direction of incident light is narrower on a air-bearing surface-side than on a side opposite thereto, wherein a face where a plasmon is excited is opposite to the vertex in the structure.

17. The thermally assisted magnetic recording head according to claim 1, wherein a surface plasmon generated on the face is converted such that a localized plasmon is generated at the vertex.

18. The thermally assisted magnetic recording head according to claim 15, wherein a lateral face of the structure is a face opposite to the face where a plasmon is excited.

19. A thermally assisted magnetic recording head comprising a magnetic field generating unit that generates a recording magnetic field and an optical near-field generating unit that generates an optical near-field, wherein the optical near-field generating unit includes a conductive structure and a waveguide that guides incident light from a light source, and the structure has a shape in which a width of an end face of a air-bearing surface-side in a direction perpendicular to a polarization direction of incident light transmitted through the waveguide gradually becomes smaller toward a vertex where an optical near-field is generated, and the waveguide is formed beside the structure, wherein a width of the structure in a direction perpendicular to the polarization direction of incident light is narrower on a air-bearing surface-side than on a side opposite thereto;

wherein a face where a plasmon is excited is opposite to the vertex in the structure;

wherein a width of the face where a plasmon is excited becomes smaller in a propagation direction in the structure.

* * * * *